US006661110B2

(12) United States Patent
Suzuki et al.

(10) Patent No.: US 6,661,110 B2
(45) Date of Patent: Dec. 9, 2003

(54) PORTABLE GENERATOR HAVING THYRISTOR-BASED RECTIFIER CIRCUIT AND INVERTER CIRCUIT

(75) Inventors: Kouji Suzuki, Kakuda (JP); Takeshi Shinohara, Kakuda (JP); Jun Takahashi, Kakuda (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 10/179,899

(22) Filed: Jun. 26, 2002

(65) Prior Publication Data

US 2002/0158470 A1 Oct. 31, 2002

Related U.S. Application Data

(63) Continuation of application No. PCT/JP00/09341, filed on Dec. 27, 2000.

(30) Foreign Application Priority Data

Dec. 27, 1999 (JP) ............................................ 11-368811

(51) Int. Cl.[7] ................................................ H02P 9/04
(52) U.S. Cl. .................. 290/40 C; 290/1 A; 290/40 B; 290/40 F
(58) Field of Search ............................. 290/1 A, 40 B, 290/40 C, 40 F

(56) References Cited

U.S. PATENT DOCUMENTS

| | | | | |
|---|---|---|---|---|
| 4,797,800 A | | 1/1989 | Simizu ........................ 363/37 |
| 5,495,162 A | * | 2/1996 | Rozman et al. ............... 290/39 |
| 5,545,928 A | * | 8/1996 | Kotani ......................... 290/14 |
| 5,646,510 A | * | 7/1997 | Kumar ...................... 290/40 B |
| 5,703,410 A | * | 12/1997 | Maekawa ............... 123/339.16 |
| 5,747,971 A | * | 5/1998 | Rozman et al. ............. 318/801 |
| 5,998,880 A | * | 12/1999 | Kumar ...................... 290/40 A |
| 6,518,736 B2 | * | 2/2003 | Sasaki et al. ................. 322/16 |

FOREIGN PATENT DOCUMENTS

| | | |
|---|---|---|
| JP | 63-181615 | 7/1998 |
| JP | 11-341823 | 12/1999 |

* cited by examiner

Primary Examiner—Nestor Ramirez
Assistant Examiner—Pedro J. Cuevas
(74) Attorney, Agent, or Firm—Finnegan, Henderson, Farabow, Garrett & Dunner, LLP

(57) ABSTRACT

A small portable generator for generating a single-phase AC voltage under PWM control is subject to output voltage fluctuations under a heavy load. With a view to reducing such output voltage fluctuations, it is intended to provide a portable generator (100) which rectifies an AC voltage generated by an AC generator (50) with a DC-voltage-generating circuit (110) using thyristors to charge a DC-power-source unit (120), and converts the DC output voltage of the DC-power-source unit (120) with an inverter circuit (130) into a single-phase AC voltage to be supplied, the portable generator (100) being provided with a constant-voltage-control unit (500) which effects control to keep the DC voltage of the DC-power-source unit (120) substantially constant by detecting the voltage of the DC-power-source unit (110) and controlling the continuity angle of the thyristors (111) in the DC-power-source unit (120), and at the same time effects control to advance the start of continuity of the thyristors (111) when the amperage flowing to the inverter circuit (130) becomes great.

1 Claim, 13 Drawing Sheets

PORTABLE GENERATOR HAVING THYRISTOR-BASED RECTIFIER CIRCUIT AND INVERTER CIRCUIT

RELATED CASES

This application is a continuation of and/or claims priority under 35 USC §119, 120 and/or 365 to the following:

PCT Patent Application No. PCT/JP00/09341, filed Dec. 27, 2000; and

Japanese Patent Application No. 11-368811 filed Dec. 27, 1999.

TECHNICAL FIELD

The present invention relates to a portable generator which generates an AC voltage of 100 V or the like by being turned by an engine.

BACKGROUND ART

Today, small generators driven by a gasoline engine or a diesel engine, permitting conveyance to where they are needed and capable of developing a per-unit output of several kilowatts, have come into extensive use.

Such portable generators permitting ready conveyance include generators enabled, by keeping the frequency of engine revolutions constant, to develop a single-phase AC voltage of around 100 V in average output voltage at a frequency of 50 or 60 Hz.

However, more recently, there have been proposed systems whereby the output of an engine-driven AC generator is once rectified into a DC voltage and this DC voltage is further converted with an inverter into an output voltage having a constant frequency of 50 Hz or 60 Hz (e.g. JP 63-114527 A and JP 63-302724 A).

Incidentally, an engine-driven small portable generator capable of developing an output of several kilowatts to about 10 kW is not only carried to where they are needed and used for power generation always in a movable state but also may be semi-permanently installed in a fixed position where it is required to operate continually for some time.

This inverter-equipped portable generator, as shown in FIG. 10, has an engine-driven AC generator 50, a DC-voltage-generating circuit 110 using rectifier diodes 115 and thyristors 111, a DC-power-source unit 120 using a large-capacitance capacitor 121 consisting of a required number of capacitors connected in parallel, an inverter circuit 130 using a power transistor, and a low pass filter 140 using a coil and a capacitor.

Further, it has, as control circuits for driving and controlling such power circuits as these DC-voltage-generating circuit 110 and inverter circuit 130, a PWM-signal-generating circuit 250, a voltage-limiting circuit 240, an overload-detecting circuit 260 and an inverter-drive circuit 255. This portable generator 100 also has, as power-supply units for driving these control circuits, a smoothing circuit 210 and a constant-voltage circuit 235.

Many of the AC generator 50 in use whose rotor is turned by such an engine has a three-phase output coil 51 and a single-phase output coil 55. In many cases, the three-phase output coil 51 can develop a maximum output of tens of amperes at hundreds of V, while the single-phase output coil 55 can develop an output of tens of amperes at tens of V.

The DC-voltage-generating circuit 110 to which the output terminal of this three-phase output coil 51 is connected is configured of a rectifier bridge circuit using three rectifier diodes 115 and three thyristors 111. The both output terminals of this rectifier bridge circuit is connect to both ends of the main smoothing capacitor 121, which uses the DC-power-source unit 120, to charge the capacitor 121.

Incidentally, the gate terminal of each thyristor 111 in the DC-voltage-generating circuit 110 is connected to the voltage-limiting circuit 240 to control the continuity angle of each thyristor 111, and the voltages at both ends of the main smoothing capacitor 121, which uses the DC-power-source unit 120, are thereby regulated.

Then, the inverter circuit 130 is configured of a bridge circuit using four power transistors. In this inverter circuit 130, a first transistor 131 and a third transistor 133, arranged in series, are connected to the DC-power-source unit 120, and a second transistor 132 and a fourth transistor 134, arranged in series, are connected to the DC-power-source unit 120. The midpoint between the first transistor 131 and the third transistor 133 is connected to a first output terminal 151 via the low pass filter 140, and the midpoint between the second transistor 132 and the fourth transistor 134 is connected to a second output terminal 152 via the low pass filter 140. Further the base of the first transistor 131 and the base of the fourth transistor 134 are commonly connected to the inverter-drive circuit 255, and the base of the second transistor 132 and the base of the third transistor 133 are commonly connected to an inverter-drive circuit 255.

A first PWM signal supplied from this inverter-drive circuit 255 to the first transistor 131 and the fourth transistor 134 and a second PWM signal supplied to the second transistor 132 and the third transistor 133 are high-frequency pulse signals of several kHz or more. The pulse width of each pulse signal is successively varied between 50 Hz and 60 Hz, and the varying quantity of the pulse width is successively increased or decreased in a sine-wave shape.

Further, the first PWM signal and the second PWM signal are reverse in phase to each other. For this reason, continuity is established between the first transistor 131 and the fourth transistor 134 by the first PWM signal, while discontinuity is ensured between the second transistor 132 and the third transistor 133 by the second PWM signal, and when the midpoint between the first transistor 131 and the third transistor 133 has a voltage VD, which is the voltage of the DC-power-source unit 120, the midpoint between the second transistor 132 and the fourth transistor 134 is at 0 V. When continuity is established between the second transistor 132 and the third transistor 133 by the second PWM signal, the first PWM signal ensures discontinuity between the first transistor 131 and the fourth transistor 134, sets the midpoint between the first transistor 131 and the third transistor 133 to 0 V, and the midpoint between the second transistor 132 and the fourth transistor 134 then to the voltage VD of the DC-power-source unit 120.

This midpoint potential between the first transistor 131 and the third transistor 133 changes over at high speed between 0 V and the voltage VD of the DC-power-source unit 120 as shown in FIG. 11A, and the duration of the DC source voltage VD successively varies. Also, the midpoint potential between the second transistor 132 and the fourth transistor 134 also changes over at high speed between 0 V and the voltage VD of the DC-power-source unit 120 as shown in FIG. 11B, and the duration of the DC source voltage VD successively varies.

As a result, a first output voltage and a second output voltage having passed the low pass filter 140 are are turned into sine-wave voltages of 50 Hz or 60 Hz as shown in FIG. 11. Then, the voltage of the first output terminal 151 and the voltage of the second output terminal 152 are generated as AC output voltages of 50 Hz or 60 Hz, with their peak level and bottom level staggered by a half period.

On the other hand, the single-phase output coil 55 of the AC generator 50 is connected to the smoothing circuit 210 in the control-power-supply circuit as shown in FIG. 10.

This smoothing circuit 210 is configured of a rectifier diode 211 and a smoothing capacitor 215. The rectifier diode 211 is inserted between the output terminal of the single-phase output coil 55 and the smoothing capacitor 215, and the smoothing capacitor 215 is charged with the output voltage of the single-phase output coil 55 to form a DC voltage.

Incidentally, the number of the rectifier diode 211 is not limited to one as shown in FIG. 10, but sometimes four rectifier diodes are used as an all-wave rectifier bridge to charge a smoothing capacitor.

Then, the output terminal of the smoothing circuit 210 is connected to the constant-voltage circuit 235, and this constant-voltage circuit 235 generates a prescribed voltage for driving control circuits.

Moreover, the terminal on the − side of this constant-voltage circuit 235 is connected to the + side of the DC-power-source unit 120, and the terminal on the + side of the constant-voltage circuit 235 is connected to the voltage-limiting circuit 240, the PWM-signal-generating circuit 250 and an inverter-drive circuit 255.

This voltage-limiting circuit 240 is configured of resistors and comparators. The first reference-voltage resistor 245 and the second reference-voltage resistor 246, arranged in series, are inserted between the + side terminal of the constant-voltage circuit 235 and the + side terminal of the DC-power-source unit 120, and the midpoint between the first reference-voltage resistor 245 and the second reference-voltage resistor 246 is connected to the reference input terminal of a comparator 243. The first voltage-dividing resistor 248 and the second voltage-dividing resistor 249, arranged in series, are inserted between the + side terminal of the constant-voltage circuit 235 and the − side terminal of the DC-power-source unit 120, and the midpoint between the first voltage-dividing resistor 248 and the second voltage-dividing resistor 249 is connected to the comparing input terminal of the comparator 243.

Further, the output terminal of the comparator 243 is connected to the + side terminal of the constant-voltage circuit 235 via a control resistor 241 as well as to the gate terminal of each thyristor 111 in the DC-voltage-generating circuit 110. In connecting the output terminal of the comparator 243 to the gate terminal of each thyristor 111, it is connected via a protective resistor 117.

Therefore, this voltage-limiting circuit 240 forms a fixed reference voltage by causing the first reference-voltage resistor 245 and the second reference-voltage resistor 246 of the voltage-limiting circuit 240 to divide a fixed voltage generated by the constant-voltage circuit 235 of the control power supply circuit. Further, this reference voltage fixed all the time is entered into the reference input terminal of the comparator 243 of the voltage-limiting circuit 240.

Moreover, in the voltage-limiting circuit 240, a voltage resulting from the addition of the output voltage of the DC-power-source unit 120 and a fixed voltage generated by the constant-voltage circuit 235 is divided by the first voltage-dividing resistor 248 and the second voltage-dividing resistor 249 to form a detection voltage, and this detection voltage is entered into the comparing input terminal of the comparator 243.

As a result, the detection voltage entered into the comparing input terminal varies with the voltage variations of the DC-power-source unit 120 and, if this detection voltage is lower than the reference voltage generated by the first reference-voltage resistor 245 and the second reference-voltage resistor 246, the output of the comparator 243 will be a + potential.

Therefore, the gate potentials of the thyristors 111 can be kept higher than the cathode potentials of the thyristors 111, and a gate current can be supplied to each thyristor 111 via the control resistor 241 to establish continuity of each thyristor 111. For this reason, when the output voltage of the three-phase output coil 51 becomes higher than the voltage of the DC-power-source unit 120, power is supplied to the DC-power-source unit 120 to raise the voltage of the DC-power-source unit 120.

Moreover, when the voltage of the DC-power-source unit 120 rises and the detection voltage entered into the comparator 243 becomes equal to the reference voltage, the output of the comparator 243 becomes 0, and the gate potential of each thyristor 111 becomes equal to the cathode potential. Therefore, each thyristor 111 is placed in a state of discontinuity.

Thus, when the voltage generated by the DC-power-source unit 120 is made lower than a fixed voltage by the voltage-limiting circuit 240, the AC generator 50 performs charging and, when the charged voltage reaches the fixed voltage, stops charging. As a result, it is possible to keep the output voltage of the DC-power-source unit 120 somewhere between 170 V and 200 V to keep the fixed voltage VD set by the voltage-limiting circuit 240 all the time.

Then, the inverter circuit 130 varies the potentials of the first output terminal 151 and the second output terminal 152 in a fixed period of 50 Hz or 60 Hz, and a single-phase AC voltage is supplied with the maximum potential difference between the voltage of the first output terminal 151 and the voltage of the second output terminal 152 being 141 V and the average voltage being 100 V.

The PWM-signal-generating circuit 250 which generates a PWM control signal for controlling this inverter circuit 130 generates the PWN control signal from a reference sine-wave such as 50 Hz, 60 Hz or the like and a triangular wave and supplies it to the inverter-drive circuit 255.

Then, the reference sine-wave of the PWM-signal-generating circuit 250 is generated in accordance with a prescribed frequency, such as 50 Hz or 60 Hz, which is the frequency of the voltage supplied from the output terminal. The PWM-signal-generating circuit 250 regulates the ratio between the voltage of the reference sine-wave and the voltage of the triangular wave, determines the frequency of the pulse signal, which is used as the PWM control signal according to the output voltage VD of the DC-power-source unit 120 entered into the inverter circuit 130 and the characteristics of the inverter circuit 130 and the low pass filter 140, and also determines the pulse width and the pulse width variation.

Moreover, this portable generator 100 is provided with the overload-detecting circuit 260, wherein a detecting resistor 261 is inserted between the DC-power-source unit 120 and the inverter circuit 130.

This overload-detecting circuit 260 is configured of the detecting resistor 261 and an arithmetic-circuit unit 265. When having detected an amperage surpassing the rated amperage, this overload-detecting circuit 260 supplies a stop signal to the inverter-drive circuit 255 according to the extent of surpassing the rating with the time factor also taken into account.

This arithmetic-circuit unit 265 uses various circuits having comparators, capacitors and resistors.

Moreover, taking into account the characteristics of the elements constituting the power circuit, in many cases, the overload-detecting circuit 260 immediately issues a stop signal when a current of double the rated amperage flows to stop the output of the inverter-drive circuit 255 from supplying the first PWM signal and the second PWM signal. On the other hand, the overload-detecting circuit 260 is designed to issue a stop signal to the inverter-drive circuit 255 when it has detected a current slightly surpassing the rated amperage and this current flow has continued for several seconds to several minutes.

Thus, in the portable generator 100, in which a three-phase AC voltage once rectified by the DC-voltage-generating circuit 110 and the DC voltage generated by the DC-power-source unit 120 is a gain converted into an AC voltage by the inverter circuit 130 can generate an AC output voltage whose frequency and voltage are stable all the time while forming a power matching the load by varying the revolutions of the AC generator 50, i.e. revolutions of the engine.

Therefore, this portable generator 100 can adjust the engine revolutions to load variations, increase the revolutions when the load is heavy, and decrease the revolutions when the load is light, thereby making it sufficient for the engine to generate the quantity of energy that the load requires, accordingly can readily adjust the output to the load level, and therefore operate efficiently.

When the portable generator 100 becomes overloaded beyond the rated output, the generator can either stop the inverter circuit 130 from operating promptly or stop the inverter circuit 130 from operating after the lapse of a prescribed length of time, bring down the output voltage to 0 to maintain the overall safety of the circuitry. Moreover, it can operate various electric devices with which the generator is loaded within an extent of several kilowatts as its rated output.

Thus, the engine-driven portable generator 100 using the inverter circuit 130, for its capability to supply single-phase AC power of 100 V as does a commercial power source, has come to be used for supplying power to various electrical devices in general.

Some of such portable generators 100 can perform parallel operation through the adjustment of the output voltage of single-phase AC power and voltage the adjustment of phase.

In such a portable generator 100 capable of performing adjustment of the output voltage and voltage phase, the AC output voltage and AC output amperage supplied from the first output terminal 151 and the second output terminal 152 of the portable generator 100 are detected, and the PWM-signal-generating circuit 250 is controlled, for instance, so as to keep the voltage and phase of the single-phase AC power supplied by this portable generator 100 identical with those of any other generator operating in parallel with it (e.g. JP 5-49174 A, JP 5-236658 A and JP 5-244726 A).

Moreover, the voltage may be adjusted not only in parallel operation but also in independent operation to prevent the voltage from being fluctuating due to the type or magnitude of the load connected to the output terminals (e.g. JP 5-211777 A).

In such a portable generator 100, in many cases, as shown in FIG. 12, the voltage and the amperage of the single-phase AC output supplied from the first output terminal 151 and the second output terminal 152 is detected by inserting an output-voltage-detecting circuit 340 between the first output terminal 151 and the second output terminal 152 following the low pass filter 140 and inserting an output-current-detecting circuit 330 also following the low pass filter 140, and thereby the PWM-signal-generating circuit 250 is controlled.

Incidentally, also in this kind of portable generator 100, as in the portable generator 100 shown in FIG. 10, the single-phase output coil 55 of the AC generator 50 is connected to a control-power-source unit 201 configured of a smoothing circuit 210 and a constant-voltage circuit 235. Therefore, it is also possible to smooth the output voltage of the auk single-phase output coil 55 with the smoothing circuit 210 and to generate a control voltage Vcc of a prescribed level with the constant-voltage circuit 235. However, the +Vcc voltage and the −Vcc voltage, as control voltages, may be generated with the control-power-source unit 201.

Moreover, the output terminals of the three-phase output coil 51 are connected to the DC-voltage-generating circuit 110 as a rectifier bridge circuit using thyristors and rectifying diodes. Therefore, as well as the above-described prior art, a DC voltage is generated by rectifying the output voltage of the three-phase output coil 51 and by charging a large-capacity capacitor as a DC-power-source unit 120, and this DC voltage is entered into the inverter circuit 130 to generate a single-phase AC voltage.

Then, the PWM-signal-generating circuit 250 is configured of a sine-wave-generating circuit 270 for generating a reference sine-wave, a triangular-wave-generating circuit 281 and a PWM-control-signal-generating circuit 285 for generating a PWM control signal. This sine-wave-generating circuit 270 generates an accurate reference sine-wave of 50 Hz or 60 Hz; the triangular-wave-generating circuit 281 generates a triangular wave of a high frequency, such as several kHz to ten-odd kHz; and the PWM-control-signal-generating circuit 285 synthesizes the reference sine-wave and the triangular wave to generate a PWM control signal composed of a pulse string in which the pulse width successively varies.

Further, this sine-wave-generating circuit 270 is configured of an oscillating circuit 271 for supplying a high-frequency signal of several MHz to ten-odd MHz, a go frequency-dividing circuit 273 for generating a clock signal of about 10 kHz by dividing the high-frequency signal supplied by the oscillating circuit 271, a pseudo-sine-wave-generating circuit 275 for generating and supplying a 50-Hz- or 60-Hz-stepwise sine-wave by generating many different potentials with a multi-stage voltage-dividing resistor and by successively selecting the different potentials with a multiplexer operating in response to a clock signal, a voltage-regulating circuit 277 for regulating the peak voltage of the stepwise sine-wave supplied by the pseudo-sine-wave-generating circuit 275, and a low pass filter 279 for generating a smooth sine-wave from the stepwise sine-wave.

Moreover, a voltage detection signal supplied from the output-voltage-detecting circuit 340 is entered into a square-wave-forming circuit 291 to generate a square wave signal having zero cross points of the AC output voltage as its leading edge and trailing edge. Then, the zero cross signal, which is a square wave signal, is entered into a start-timing circuit 293 and a phase-comparator circuit 297.

Then, the start-timing circuit 293 causes the pseudo-sine-wave-generating circuit 275 to supply the pseudo-sine-wave by undoing the reset stage of the pseudo-sine-wave-generating circuit 275 in the sine-wave-generating circuit 270.

If the output-voltage-detecting circuit 340 detects any voltage variation between the first output terminal 151 and the second output terminal 152 when, this pseudo-sine-wave-generating circuit 275 being in a reset stage, no reference sine-wave is supplied from the sine-wave-generating circuit 270, i.e. when the inverter circuit 130 is not working, the start-timing circuit 293 releases the pseudo-sine-wave-generating circuit 275 from its reset state in response to a zero cross signal from the square-wave-forming circuit 291. Therefore, the phase of the reference sine-wave supplied by the sine-wave-generating circuit 270 and the phase of the voltage generating between the first output terminal 151 and the second output terminal 152 can be made identical to each other.

To add, in starting the operation of the pseudo-sine-wave-generating circuit 275, even if the zero cross signal is not entered into the start-timing circuit 293 within a prescribed period of time, the reset state of the pseudo-sine-wave-generating circuit 275 is undone to cause the sine-wave-generating circuit 270 to start supplying a reference sine-wave.

Then, a current detection signal from the output-current-detecting circuit 330 is entered into a square-wave-forming circuit 295, an overload-detecting circuit 269 and a limit-value-detecting circuit 299. The square-wave-forming circuit 295 generates a zero cross signal matching the phase of the output current; the overload-detecting circuit 269 generates a stop signal when the rated amperage has been surpassed; and the limit-value-detecting circuit 299 generates a voltage regulating signal when an amperage not above the rated amperage goes out of the range between prescribed lower and upper limits.

This square-wave-forming circuit 295, on the basis of a current detection signal supplied from the output-current-detecting circuit 330, generates a square wave signal whose leading edge and trailing edge are zero cross points of the AC output amperage. Then, it enters this square wave signal, as a zero cross signal, into the phase-comparator circuit 297.

Moreover, the phase-comparator circuit 297 compares the phase of the output current with the phase of the output voltage according to the zero cross signal based on the current detection signal and the zero cross signal based on the voltage detection signal. If the current phase is behind the voltage phase, it supplies an addition signal as a phase regulating signal to the frequency-dividing circuit 273. On the other hand, if the current phase is ahead of the voltage phase, it supplies a subtraction signal as a phase regulating signal to the frequency-dividing circuit 273.

Then, the frequency-dividing circuit 273 in the sine-wave-generating circuit 270, when generating a clock signal of several kHz to ten-odd kHz by dividing a high-frequency signal, adds one pulse at every few hundreds of pulses of the clock signal if an addition signal is entered from the phase-comparator circuit 297. On the other hand, if a subtraction signal is entered from the phase-comparator circuit 297, it generates a clock signal by subtracting one pulse at every few hundreds of pulses of the clock signal.

In this way, the portable generator 100 in which voltage fluctuations are prevented, when the current phase is behind the voltage phase, slightly advances the phase of the pseudo-sine-wave and, accordingly, the phase of the reference sine-wave by increasing the pulses of the clock signal. On the other hand, when the current phase is ahead of the voltage phase, it slightly delays the phase of the reference sine-wave by subtracting pulses of the clock signal. Thereby the phase of the PWM control signal is adjusted so as to adjust the phase of the single-phase AC voltage supplied by the portable generator 100.

Moreover, the overload-detecting circuit 269 into which the current detection signal supplied from the output-current-detecting circuit 330 is entered, on the basis of the current detection signal supplied from the output-current-detecting circuit 330, immediately issues a stop signal if the rated amperage is greatly surpassed. On the other hand, it performs time integration and issues a stop signal after a prescribed length of time if the rated amperage is only slightly surpassed. Then, this stop signal is entered into a voltage-control circuit 240 and the inverter-drive circuit 255, resulting in cutting off a gate current supplied by the voltage-control circuit 240 to stop the operation of the DC-voltage-generating circuit 110, and also to stop the supply of the first PWM signal and the second PWM signal supplied by the inverter-drive circuit 255. Thereby the operation of the inverter circuit 130 is stopped.

Further, the limit-value-detecting circuit 299 into Apt; which the current detection signal supplied by the output-current-detecting circuit 330 is entered is a circuit in which the upper limit and lower limit of amperage are set. This limit-value-detecting circuit 299 supplies a voltage regulating signal to the voltage-regulating circuit 277 to lower or raise the peak level (amplitude) of the reference sine-wave so as to slightly increase the output voltage between the first output terminal 151 and the second output terminal 152 when the amperage of the current detection signal has dropped below the lower limit of amperage.

Thus, in the portable generator 100 provided equipped with the limit-value-detecting circuit 299, since it is enabled to finely adjust the output voltage by setting the upper limit of amperage and the lower limit of amperage within the range of the rated amperage and by adjusting the duty ratio of the first PWM signal and the second PWM signal, under the condition in which plural generators are operating in parallel, the load can effectively be shared on each portable generator 100, either by slightly raising the output voltage to increase the output current if the shared load is small or by slightly reducing the output voltage if the current fed to the load is near the limit of the rated amperage.

Moreover, in the portable generator 100, the output voltage varies according to the capacity or the type of the load when the portable generator 100 is not operated in parallel with any other generator, i.e. when the portable generator 100 is used by itself in independent operation. Thus, the portable generator 100 is sometimes made to stabilize the level of the single-phase AC voltage, as the output voltage, by regulating either the amplifying rate of the voltage-regulating circuit 277 or the voltage of the triangular wave supplied from the triangular-wave-generating circuit 281 on the basis of the peak voltage detected by the output-voltage-detecting circuit 340.

As described above, the portable generator, generating an AC voltage with an engine-driven three-phase generator, rectifying the AC voltage with a DC-voltage-generating circuit using thyristors, charging a DC-power-source unit using a large-capacitance capacitor, and generating a single-phase AC voltage of a fixed frequency and of a fixed voltage from the DC voltage supplied from this DC-voltage-generating circuit with inverter circuit, can easily and effectively provide a single-phase AC voltage of a fixed voltage.

DISCLOSURE OF THE INVENTION

However, an engine-driven portable generator 100 may suffer a drop in output voltage when the load is heavy and the output power nears the rated output capacity of the portable generator.

Moreover, also proposed is a portable generator 100 which, when a heavy load is connected thereto, prevents the output voltage from dropping by adjusting the pulse width of the PWM signal. However, this also involves the problem that, if the output voltage level is maintained by altering the pulse width of the PWM singal when the output current is increased, heat emission from the power circuit will increase, resulting in a fall in the conversion efficiency of the engine output to the output electric power.

This problem that arises when the output current increases to invite a heavily loaded state approaching the rated output capacity of the portable generator means that, as shown in FIG. 13, when the load increases with the output voltage V being kept constant, the output current A increases and the output voltage VD of the DC-power-source unit varies. For this reason, when this DC voltage VD is converted into a single-phase AC voltage in accordance with a PWM signal of the same fixed pulse width as that under a light load, there arises a drop in output voltage. Then, when the DC voltage, which is the input voltage into the inverter circuit, slightly drops, if it is attempted to maintain the output voltage from the output terminals by altering the pulse width of the PWM signal, increasing the current in flow into the inverter circuit and raising the duty ratio of the output voltage of the inverter circuit, the heat emission from the power circuit rapidly increases.

Then, this pulsation of the DC voltage can be reduced by increasing the capacitor capacitance of the DC power source unit. The present applicant has achieved the object of providing a portable generator capable of preventing the output voltage from varying even under a heavy load and efficiently respond to such a load by enhancing the efficiency of the rectifier circuit, which is the DC-voltage-generating circuit using thyristors.

The present invention provides a portable generator (100) generating an AC voltage with an AC generator (50) turned by an engine, rectifying this AC voltage by a thyristor-based rectifier circuit which serves as a DC-voltage-generating circuit (110) to charge a DC-power-source unit (120), converting the DC voltage, which is generated by charging the DC-power-source unit (120), into a single-phase AC voltage of a prescribed frequency and of a constant voltage by an inverter circuit (130) to supply from output terminals (151 and 152); which is provided with a constant-voltage-control unit (500) that controls to keep the DC voltage of the DC-power-source unit (120) substantially constant by detecting the voltage at the DC-power-source unit (120) and subsequently by controlling the continuity angle of thyristors (111) in the DC-voltage-generating circuit (110), and that controls, by detecting the amperage flowing in the inverter circuit (130), to advance the start of continuity establishment of the thyristors (111) when the amperage flowing in the inverter circuit (130) increases.

Thus, since the constant-voltage-control unit (500) is provided to advance the start of continuity establishment of the thyristors (111) if the amperage of the current flowing in the inverter circuit (130) increases, the current to charge the DC-power-source unit (120) is increased by the DC-voltage-generating circuit (110) if the load is heavy and the output current is great, so that, even if the load current is large, the DC voltage supplied by the DC-power-source unit (120) can be prevented from dropping and that the voltage supplied from the output terminals (151 and 152) can be prevented from dropping.

DETAILED DESCRIPTION

In the portable generator according to the present invention, an AC generator is turned by an engine developing an output several kilowatts to 10 kW, a three-phase output voltage of the AC generator is once rectified into a DC voltage, and the DC voltage is converted into a single-phase AC voltage of a prescribed frequency by an inverter circuit. It is intended to be a portable generator as a small power source to be frequently moved from one position to another in the place of its use or operated in a fixed installed state in the place of its use where it is brought into.

Figure 1:
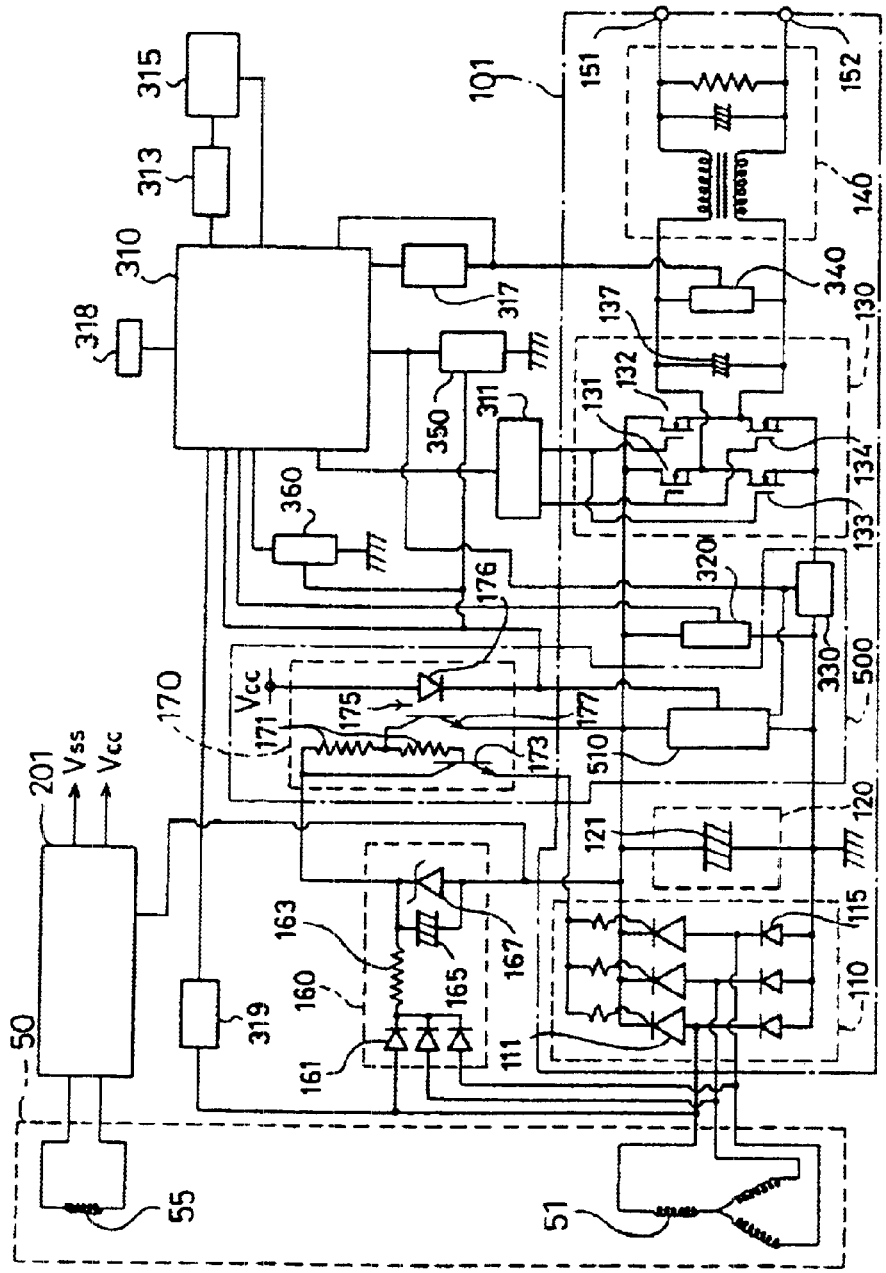
FIG. 1 is a block diagram showing an overall view of a portable generator according to the present invention.

This portable generator has an AC generator 50 whose rotor is turned by an engine and, as shown in FIG. 1, has a power circuit 101 mainly comprising a DC-voltage-generating circuit 110, a DC-power-source unit 120 and an inverter circuit 130. The portable generator 100 further has a microcomputer as a central control unit 310 for setting the frequency of the output voltage supplied from the output terminals of the power circuit 101 and for controlling the whole of the portable generator 100 on the basis of detection signals from detecting circuits provided in different parts, and has a control-power-source unit 201 for forming operational powers for these control unit and detecting circuits.

This central control unit 310 sets the frequency of the output voltage to a prescribed fixed frequency such as 50 Hz or 60 Hz with a setting switch 318. It controls the operation of the inverter circuit 130 on the basis of detection signals from a DC-voltage-detecting circuit 320, an output-current-detecting circuit 330 and an output-voltage-detecting circuit 340 provided in the power circuit 101, and also controls the opening and closing of an engine throttle on the basis of a detection signal from a revolution-frequency-detecting circuit 319 and an opening degree signal from a throttle-control mechanism 315.

Incidentally, the setting switch 318 is also enabled to regulate and set the output voltage as well as to set the frequency.

The AC generator 50 in this portable generator 100 has a three-phase output coil 51 and a single-phase output coil 55, and the three-phase output coil 51 is connected to the power circuit 101 while the single-phase output coil 55 is connected to the control-power-source unit 201.

Then, the output terminals of the three-phase output coil 51, as shown in FIG. 1, are connected to the DC-voltage-generating circuit 110 comprising a rectifier bridge using three rectifier diodes 115 and three thyristors 111 as well as to a gate-voltage-generating circuit 160.

This DC-voltage-generating circuit 110 connects the connecting point between the cathode of each rectifier diode 115 and the anode of each thyristor 111 to each output terminal of the three-phase output coil 51, connects the anodes of the rectifier diodes 115 collectively to the − side terminal of the DC-power-source unit 120 and to the inverter circuit 130, and connects the cathodes of the thyristors 111 collectively to the + side terminal of the DC-power-source unit 120 and to the inverter circuit 130.

Moreover, the gate-voltage-generating circuit 160 connected to the output terminals of the three-phase output coil 51 is formed of a rectifier diode, a limiting resistor, a power supply capacitor and a Zener diode.

Thus, the output terminals of the three-phase output coil 51 are connected to the anodes of the rectifier diode 161; the cathodes of the rectifier diodes 161 are commonly connected to the + side terminal of a power supply capacitor 165 via a limiting resistor 163; the − side terminal of the power supply capacitor 165 is connected to the + side of the DC-power-source unit 120; and a Zener diode 167 is connected in parallel to the power supply capacitor 165.

Therefore, this gate-voltage-generating circuit 160 can form and supply a voltage higher than the voltage of the +side terminal of the DC-power-source unit 120 by the normal voltage of Zener diode 167.

The output terminals of this gate-voltage-generating circuit 160 are connected to the gate terminals of the thyristors 111 in DC-voltage-generating circuit 110 via a thyristor-control circuit 170.

This thyristor-control circuit 170, which is a circuit constituting a part of a constant-voltage-control unit 500 described later, is formed of a switching transistor 173, a switching-control resistor 171 and a photocoupler 175.

Thus, the collector of a PNP transistor as the switching transistor 173 is connected to the output terminal of the gate-voltage-generating circuit 160, and the emitter of the switching transistor 173 is connected to the gate terminal of each thyristor 111. In connecting the emitter to the gate terminal of each thyristor 111, the connection is accomplished by using the protective resistor 117.

The base of the switching transistor 173 is connected to the output terminal of the gate-voltage-generating circuit 160 via the switching-control resistor 171, and the midpoint of the switching-control resistor 171 is connected to the + side terminal of the DC-power-source unit 120 via a phototransistor 176 of the photocoupler 175.

Incidentally, the collector of the phototransistor 176 of the photocoupler 175 is connected to the midpoint of the switching-control resistor 171 and the emitter thereof to the + side terminal of the DC-power-source unit 120. The anode of a light emitting diode 177 of the photocoupler 175 is connected to the output terminal of a second control voltage Vcc in the control-power-source unit 201 and the cathode thereof to a continuity-control-signal-generating circuit 510, a stopping circuit 360 and an overcurrent-detecting circuit 350.

Therefore, when the light emitting diode 177 of the photocoupler 175 is turned on, this thyristor-control circuit 170 places the phototransistor 176 in a state of continuity. Thus, it brings down the midpoint potential of the switching-control resistor 171 to the + side terminal voltage of the DC-power-source unit 120, and places the switching transistor 173 in a state of discontinuity. Then, when the light emitting diode 177 is not turned on, it places the switching transistor 173 in a state of continuity. Subsequently, the output current of the gate-voltage-generating circuit 160 is supplied to each thyristor 111 as the gate current of the thyristor 111, and this gate current used as a continuity signal can place each of the thyristors 111 in the DC-voltage-generating circuit 110 in a state of continuity.

For this reason, it is possible to supply the output power of the three-phase output coil 51 to the DC-power-source unit 120 connected to the both output terminals of the DC-voltage-generating circuit 110.

Moreover, the inverter circuit 130 connected to the both output terminals of the DC-voltage-generating circuit 110 is configured of a bridge circuit comprising a power transistor and a smoothing capacitor 137.

This inverter circuit 130 connects the first transistor 131 and the third transistor 133 in series to the DC-power-source unit 120 and also connects the second transistor 132 and the fourth transistor 134 in series to the DC-power-source unit 120. Further, the midpoint between the first transistor 131 and the third transistor 133 is connected to the first output terminal 151 via the low pass filter 140, and the midpoint between the second transistor 132 and the fourth transistor 134 is connected to the second output terminal 152 via the low pass filter 140.

Figure 2:
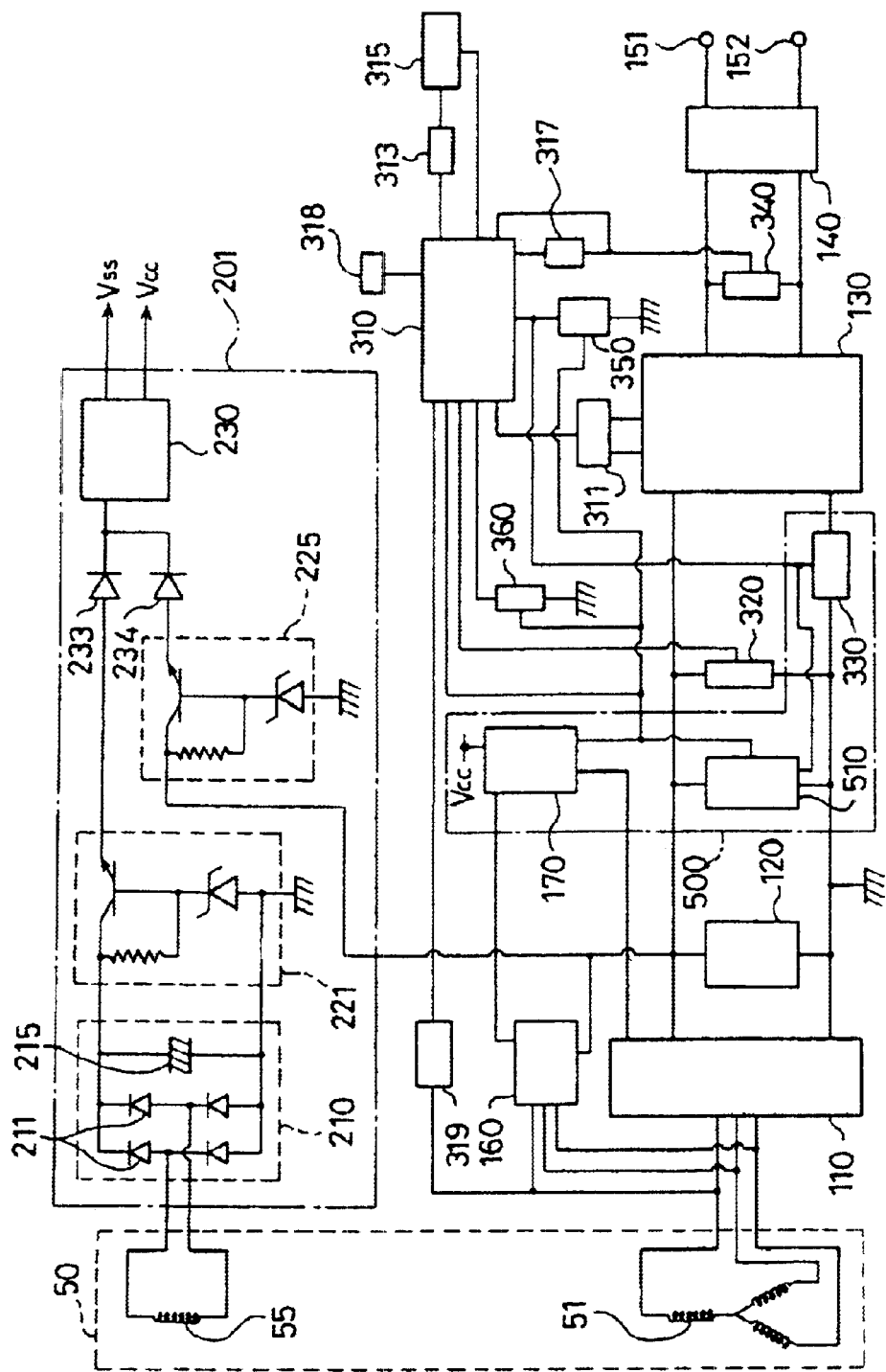
FIG. 2 is a circuit block diagram mainly of the power supply unit of the portable generator according to the invention.

Moreover, the single-phase output coil 55 of the AC generator 50, as shown in FIG. 2, is connected to the smoothing circuit 210 of the control-power-source unit 201. This smoothing circuit 210 performs all-wave rectification with a bridge rectifier circuit using four rectifier diodes 211 and charges the smoothing capacitor 215.

This control-power-source unit 201 has, in addition to the smoothing circuit 210, a first constant-voltage circuit 221, a second constant-voltage circuit 225 and a regulator 230. It converts the output voltage of the smoothing circuit 210 into a fixed voltage of around 15 V with the first constant-voltage circuit 221, and applies this fixed voltage to the regulator 230 via a first anti-reverse diode 233. This control-power-source unit 201 also converts a voltage of the + side terminal of the DC-power-source unit 120 into a fixed voltage of around 12 V with the second constant-voltage circuit 225, and applies this fixed voltage to the regulator 230 via a second anti-reverse diode 234.

The regulator 230 forms a first control voltage Vss of around 10 V and a second control voltage Vcc of around 5 V. Then a motor controlling the engine throttle to be described afterwards is driven by the first control voltage Vss from the regulator 230, and the second control voltage Vcc is supplied to the central control unit 310 and other control circuit elements.

To add, this control-power-source unit 201 usually supplies the regulator 230 with a DC voltage generated by the smoothing circuit 210 and the first constant-voltage circuit 221 from the AC voltage supplied by the single-phase output coil 55. Further, it generates the first control voltage Vss and the second control voltage Vcc with the regulator 230, and supplies them to each circuit element. When disconnection or some other trouble arises in the single-phase output coil 55 or elsewhere, if the DC-power-source unit 120 is in operation, the second constant-voltage circuit 225 supplies power to the regulator 230, which is then caused to supply the first control voltage Vss and the second control voltage Vcc to keep the portable generator 100 operating.

Moreover, in the control power source 201, a switching circuit for detecting the output voltage of the first constant-voltage circuit 221 and for performing a change-over may be arranged on the input side of the regulator 230 in place of the first anti-reverse diode 233 and the second anti-reverse diode 234. In this case, while keeping the output voltage of the first constant-voltage circuit 221 and the output voltage of the second constant-voltage circuit 225 equal, power from the first constant-voltage circuit 221 is usually supplied to the regulator 230 and, when the output of the first constant-voltage circuit 221 has stopped, the switching circuit may be changed over to supply the output voltage from the second constant-voltage circuit 225 to the regulator 230. Further, the control power sourse is so formed that, using an AC generator 50 having no single-phase output coil 55, the smoothing circuit 210 and the first constant-voltage circuit 221 may be omitted, that the voltage of the DC-power-source unit 120 may be lowered by the second constant-voltage circuit 225 and that the power from the DC-power-source unit 120 may be supplied to the regulator 230 all the time thereby to form a control voltage.

Then, a continuity-control-signal-generating circuit 510 for controlling the voltage of the DC-power-source unit 120 is a circuit to constitute a constant-voltage-control unit 500, together with the above-described thyristor-control circuit 170 and the output-current-detecting circuit 330 to be described afterwards.

Figure 3:
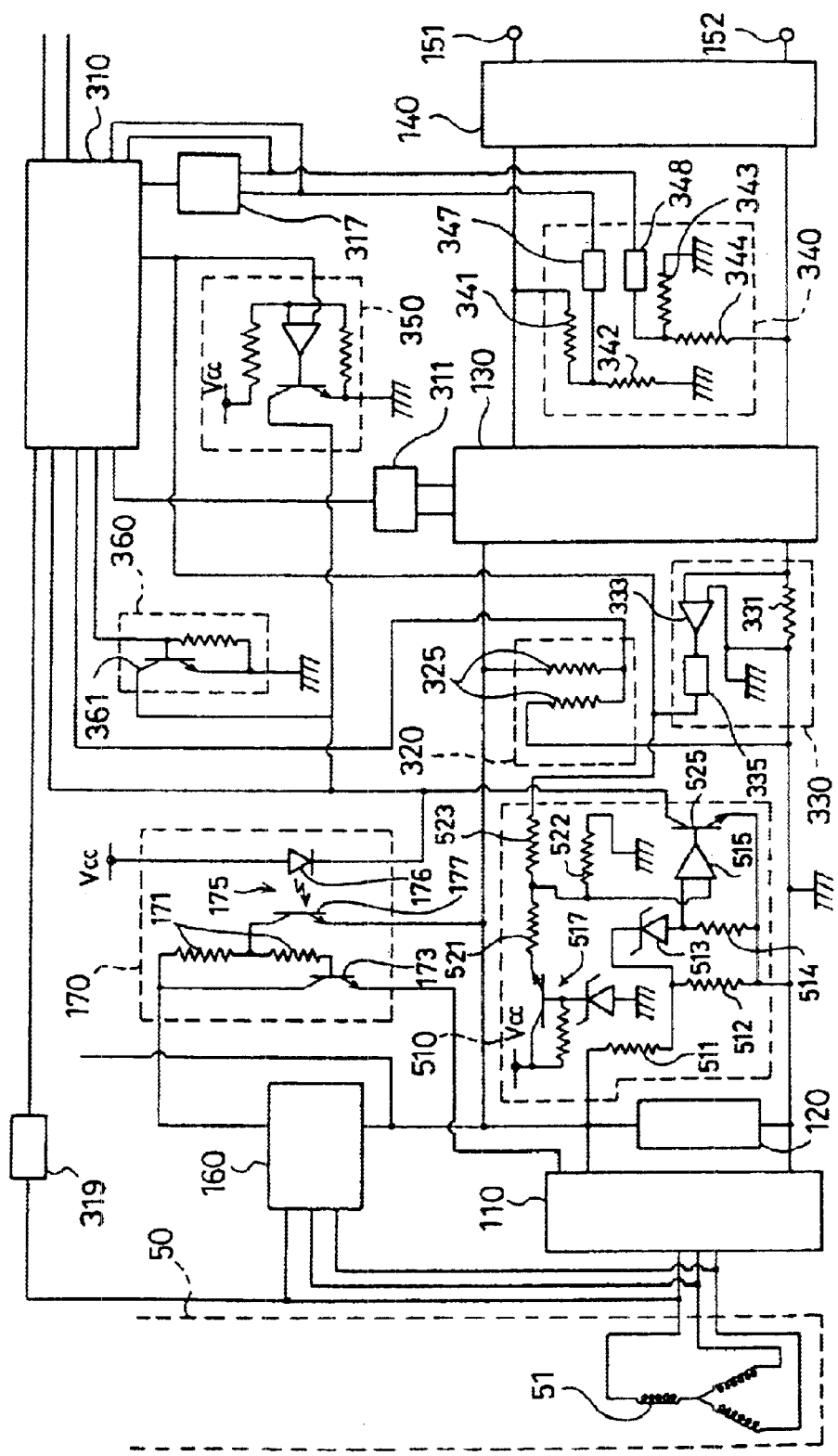
FIG. 3 is a circuit block diagram mainly of the detecting circuit of the portable generator according to the invention.

This continuity-control-signal-generating circuit 510, as shown in FIG. 3, uses resistors, Zener diodes, switching transistors, comparator circuits, etc. In the continuity-control-signal-generating circuit 510, voltage-dividing resistors 511, 512 consisting of two resistors arranged in series divide the voltage of the DC-power-source unit 120, and the midpoint potential between the voltage-dividing resistors 511, 512 is further reduced by a Zener diode 513 and a detecting resistor 514. Then, the potential of the detecting resistor 514 is entered into a comparator circuit 515 to control the continuity of a switching transistor 525. Further, this continuity-control-signal-generating circuit 510 stabilizes the second control voltage Vcc from the control-power-source unit 201 into a fixed voltage with a constant-voltage circuit 517 using a Zener diode and a transistor, and a reference voltage resulting from the division of this fixed voltage by a first reference resistor 521 and a second reference resistor 522 is entered into the reference voltage input terminal of the comparator circuit 515.

To add, the output terminals of the output-current-detecting circuit 330 described below are connected to the midpoint between the first reference resistor 521 and the second reference resistor 522 via an adding resistor 523.

Then, the switching transistor 525 in this continuity-control-signal-generating circuit 510 is arranged in a serial relationship to the light emitting diode 177 of the photocoupler 175 in the thyristor-control circuit 170, and applies the second control voltage Vcc to the light emitting diode 177 to which it is in a serial relationship, and controls the turning-on of the light emitting diode 177 by intercepting the continuity of the switching transistor 525.

Therefore, in this continuity-control-signal-generating circuit 510, when the output voltage of the DC-power-source unit 120 rises, the detection potential of the detecting resistor 514 rises beyond the reference voltage generated by the first reference resistor 521 and the second reference resistor 522 to place the switching transistor 525 in a state of continuity, thereby supplies a continuity control signal to the thyristor-control circuit 170 to turn on the light emitting diode 177 in the thyristor-control circuit 170. As a result, the thyristor-control circuit 170 stops supplying a continuity signal to the DC-voltage-generating circuit 110, places the thyristors 111 in the DC-voltage-generating circuit 110 in a state of discontinuity, and stops power supply from the AC generator 50 to the DC-power-source unit 120.

Moreover, when the voltage of the DC-power-source unit 120 drops beyond a prescribed voltage VD, the detection potential of the detecting resistor 514 falls below the reference voltage, placing the switching transistor 525 in a state of discontinuity, and causes the thyristor-control circuit 170 to issue a continuity signal to each of the thyristors 111 of the DC-voltage-generating circuit 110 to place the thyristors 111 in a state of continuity.

Thus, when the output voltage of the DC-power-source unit 120 rises slightly above the prescribed level VD, continuity of each thyristor 111 is cut off. If it is not above the prescribed level VD, a continuity signal is entered into the gate of each thyristor 111 to place the thyristor 111 in a state of continuity so that the potential of the DC-power-source unit 120 can be kept at the fixed level VD all the time.

Figure 4:
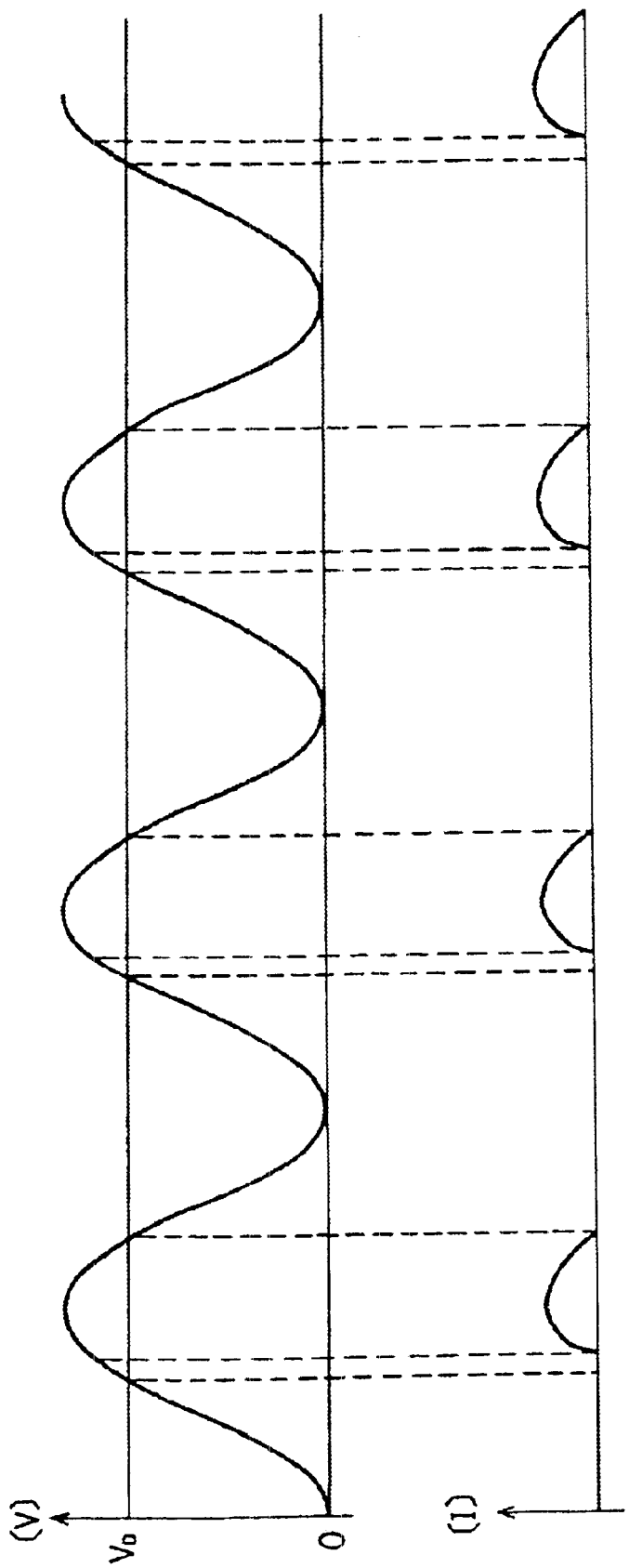
FIG. 4 is a graph showing the continuity state of the thyristors in the DC voltage generating unit.

Moreover, when a single-phase AC voltage is supplied from the first output terminal 151 and the second output terminal 152, if the output voltage of the DC-power-source unit 120 is maintained at the prescribed level VD, the state of continuity of the thyristors 111 in the DC-voltage-generating circuit 110 with respect to one phase of the three-phase AC voltage supplied by the AC generator 50 is as follows. Namely, as shown in FIG. 4, when the output voltage of the three-phase output coil 51 has surpassed the voltage VD of the DC-power-source unit 120, the thyristors 111 are placed in a state of continuity, power is supplied to the DC-power-source unit 120, and the power drain from the DC-power-source unit 120 is compensated for to keep the output voltage of the DC-power-source unit 120 constant. Although FIG. 4 illustrates only one phase of the three-phase AC voltage, power is supplied to the DC-power-source unit 120 similarly in every one of the three phases.

Figure 5:
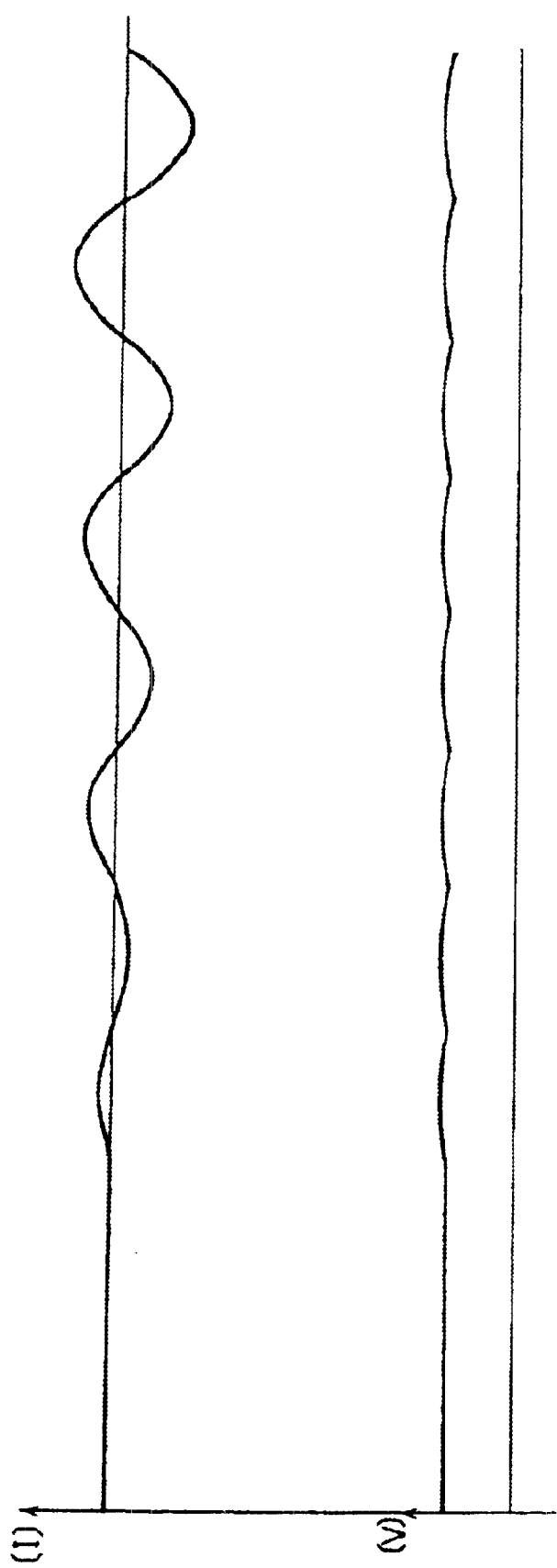
FIG. 5 is a graph showing the relationship between the output current and the DC voltage in the portable generator according to the invention.

Then, in this continuity-control-signal-generating circuit 510, at the reference voltage input terminal of the comparator circuit 515, an output current signal from the output-current-detecting circuit 330 is added via the adding resistor 523 to the reference voltage resulting from the division of the fixed voltage stabilized by the constant-voltage circuit 517. For this reason, as shown in FIG. 5, when the output current from the first output terminal 151 and the second output terminal 152 has increased, a reference voltage which rises in a half wave-rectified shape in proportion to the amperage of this output current is entered.

Therefore, since the output voltage of the DC-power-source unit 120 slightly exceeds the prescribed level VD, the detection potential of the detecting resistor 514 is slightly higher than the reference voltage. Thereby, although the continuity of the switching transistor 525 is established to place the thyristors 111 in a state of discontinuity, i.e. though thyristors 111 are about to be placed in a state of continuity when the output voltage of the DC-power-source unit 120 has been reduced to the prescribed level VD by the output current, this continuity-control-signal-generating circuit 510 can place the switching transistor 525 in a state of discontinuity and the thyristors 111 in a state of continuity because the rise of the reference voltage due to the output current makes the reference voltage entered into the comparator circuit 515 higher than the detected voltage.

Thus, the output voltage of the DC-power-source unit 120 is slightly higher than the prescribed level VD. Thereby, although, after the current output from the first output terminal 151 and the second output terminal 152 causes the output voltage of the DC-power-source unit 120 has dropped to the prescribed level VD, a continuity control signal should be supplied to cause the thyristor-control circuit 170 to start the output of a continuity signal to place the thyristors 111 in a state of continuity, this constant-voltage-control unit 500 detects the output current with the output-current-detecting circuit 330, raises the reference voltage on the basis of the output current signal, supplies the continuity control signal to the thyristor-control circuit 170 earlier than the output voltage of the DC-power-source unit 120 falls to the prescribed level VD, and causes the thyristor-control circuit 170 to supply a continuity signal to place the thyristors 111 in a state of continuity.

Then, in supplying of the continuity control signal earlier than in the absence of load, the rise of the reference voltage is made greater correspondingly to the amperage of the output current to advance the earlier start of continuity signal supply.

To add, the output-current-detecting circuit 330, besides detecting the current flowing in the inverter circuit 130 with its detecting resistor 331 and comparator 333 and supplying the continuity-control-signal-generating circuit 510 with an output current signal clear of harmonic contents such as the PWM content with its detecting low pass filter 335, supplies the output current signal to a central control unit 310 and an overcurrent-detecting circuit 350.

Moreover, as the output-current-detecting circuit 330, a current detector using an induction coil maybe used in place of the detecting resistor 331.

Then, a DC voltage detecting circuit 320 connects a voltage-dividing resistor 325 to be inserted between the two terminals of the DC-power-source unit 120. This voltage-dividing resistor 325 divides the output voltage of the DC-power-source unit 120, and enters the output voltage of the DC-power-source unit 120 into the central control unit 310 as a DC voltage signal.

Moreover, the output-voltage-detecting circuit 340 inserted between the inverter circuit 130 and the low pass filter 140 divides and lowers the first output voltage and the second output voltage of the inverter circuit 130 each with a voltage-dividing resistor to carry out voltage detection. Then, a first detection voltage resulting from the division of the first output voltage by voltage-dividing resistors 341, 342 and a second detection voltage resulting from the division of the second output voltage by voltage-dividing resistors 343, 344 are entered into the central control unit 310 via detecting low pass filters 347, 348 as output voltage signals.

Further, in the portable generator 100, when entering output voltage signals supplied from the output-voltage-detecting circuit 340 into the central control unit 310, a first output voltage signal and a second output voltage signal, which are analog signals, are entered into the central control unit 310, and a zero cross signal from a square-wave-forming circuit 317 is also entered into the central control unit 310.

This square-wave-forming circuit 317 generates a square wave based on the differential voltage between the first output voltage and the second output voltage both forming a sine-wave. In the square-wave-forming circuit 317, it uses the zero cross point at the differential voltage between the first output voltage and the second output voltage both forming a sine-wave as an edge of this square wave, and the square-wave-forming circuit 317 generates a zero cross signal indicating the timing of the zero cross point in the output voltage supplied from the portable generator 100, and enters it into the central control unit 310.

Moreover, the overcurrent-detecting circuit 350 is formed of resistors 351, 352, a comparator 355 and a switching transistor 357. This overcurrent-detecting circuit 350 generates a reference voltage by dividing, with the voltage-dividing resistors 351, 352 for reference voltage generation, the second control voltage Vcc generated by the control-power-source unit 201 and, when the potential of the output current signal supplied by the output-current-detecting circuit 330 becomes higher than the reference voltage, establishes continuity of the switching transistor 357.

Further, the emitter of this switching transistor 357 is grounded, and the collector thereof is connected to the cathode of the light emitting diode 177 in the photocoupler 175. Therefore, this overcurrent-detecting circuit 350 causes the thyristor-control circuit 170 to stop supplying the continuity signal when continuity of the switching transistor 357 is established.

Incidentally, into the central control unit 310, the DC voltage from the DC detecting circuit 320, the output current signal from the output-current-detecting circuit 330, the output voltage signal from the output-voltage-detecting circuits 340 and the zero cross signal from the square-wave-forming circuit 317 based on this output voltage signal are entered as detection signals, as well as the detection signal for the frequency of the output voltage supplied by the three-phase output coil 51 as the revolution frequency signal from the revolution-frequency-detecting circuit 319. Furthermore, the cathode potential of the light emitting diode 177 is also entered as the conductivity rate detection signal, and the throttle opening degree signal is also entered from the throttle-control mechanism 315. However, the opening degree signal from the throttle-control mechanism 315 may sometimes be omitted.

Figure 6:
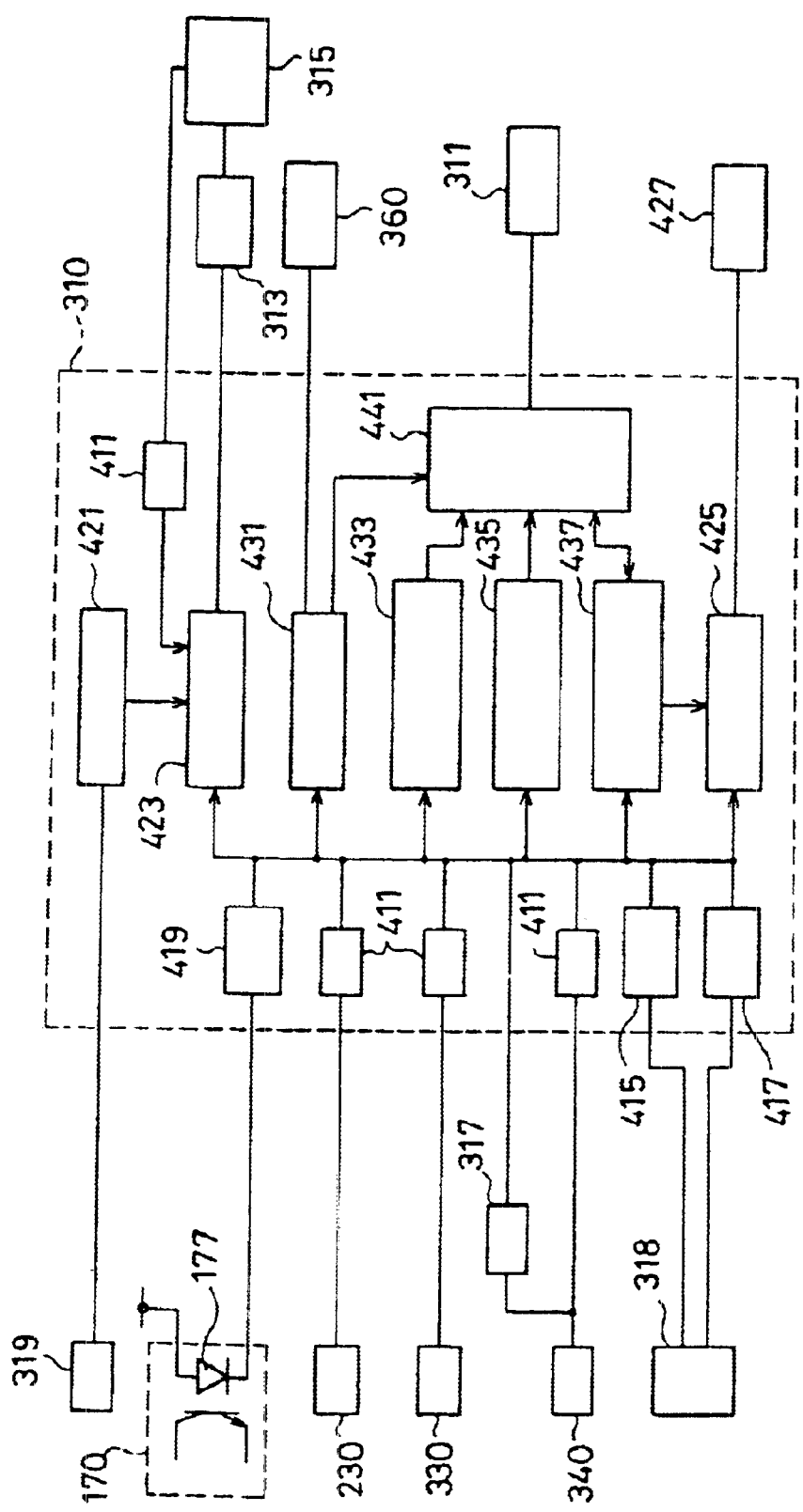
FIG. 6 is a block diagram schematically showing the central control unit in the portable generator according to the invention.

The central control unit 310 into which these detection signals are entered has, as its operation, as shown in FIG. 6, in addition to a PWM-signal-generating unit 441 for supplying a PWM control signal to a PWM driver, an independent-operation-control unit 435 and a synchronous-operation-control unit 437 for distinguishing between independent operation and parallel operation at the time of starting control according to the output voltage signal from the output-voltage-detecting circuits 340 and the zero cross signal from the square-wave-forming circuit 317 and for controlling the PWM-signal-generating unit 441. Further, formed are an output-frequency-setting unit 415 for setting the frequency of the single-phase AC voltage in accordance with a signal from the setting switch 318, an output-voltage-setting unit 417 for regulating and setting the output voltage of the single-phase AC voltage in accordance with a signal from the setting switch 318, a voltage-waveform-monitoring unit 433 for monitoring the single-phase AC voltage supplied from the first output terminal 151 and the second output terminal 152 in accordance with an output voltage signal from the output-voltage-detecting circuit 340, an engine-speed-detecting unit 421 for judging the engine revolutions according to a revolution frequency signal from the revolution-frequency-detecting circuit 319, a throttle-opening-control unit 423 for supplying a revolution control signal to a throttle driver 313 on the basis of the output current signal, the revolution frequency signal and the opening degree signal from the throttle-control mechanism 315, a circuit-protecting unit 431 for supplying a stop control signal to the stopping circuit 360 on the basis of an output current signal from the output-current-detecting circuit 330 and a DC voltage signal from the DC-voltage-detecting circuit 320, a continuity-rate-detecting unit 419 for detecting the continuity rate of the thyristors 111 in the DC-voltage-generating circuit 110 from the cathode potential of the light emitting diode 177 in the thyristor-control circuit 170, and a display-control unit 425 for supplying signals to have the operating state of the portable generator 100 displayed on an operating-state-display unit 427 according to the state of control operation of the central control unit 310.

To add, this central control unit 310 as a microcomputer, though not shown, has a quartz oscillator of well over 10 M Hz in oscillation frequency, and operates according to the output of this quartz oscillator as the reference clock, and has a read-only memory (ROM) for storing control programs, control data tables and the like, a random access memory (RAM) for performing arithmetic processing, and a frequency-dividing circuit for dividing the frequency of the reference clock to generate required clock signal. Moreover, the central control unit 310 is also provided with an analog-to-digital converter 411 for converting inputted analog signals into digital signals.

Then, when the throttle-control mechanism 315 is to control the rotation of the throttle valve by using a pulse motor, a pulse counter may be built into the throttle-opening-control unit 423, and the pulse counter would be counted up or down according to a revolution control signal supplied from the throttle-opening-control unit 423 to the throttle driver 313, so that the opening degree signal from the throttle-control mechanism 315 could be omitted. In this case, the throttle opening degree is stored in the throttle-opening-control unit 423.

Then, the PWM-signal-generating unit 441 has a PWM reference table, and supplies a PWM control signal to a PWM driver 311 in accordance with this PWM reference table to control continuity and discontinuity of transistors in the inverter circuit 130, as the first transistor 131 to the fourth transistor 134.

This PWM reference table contains many PWM reference values, which consists of one hundred to several hundreds of values corresponding to the values of a curve constituting one period of a sine-curve.

Then, the PWM-signal-generating unit 441 of the central control unit 310 successively reads PWM reference values out of this PWM reference table in a fixed period to form a PWM control signal, and supplies this PWM control signal to the PWM driver 311.

Figure 7:
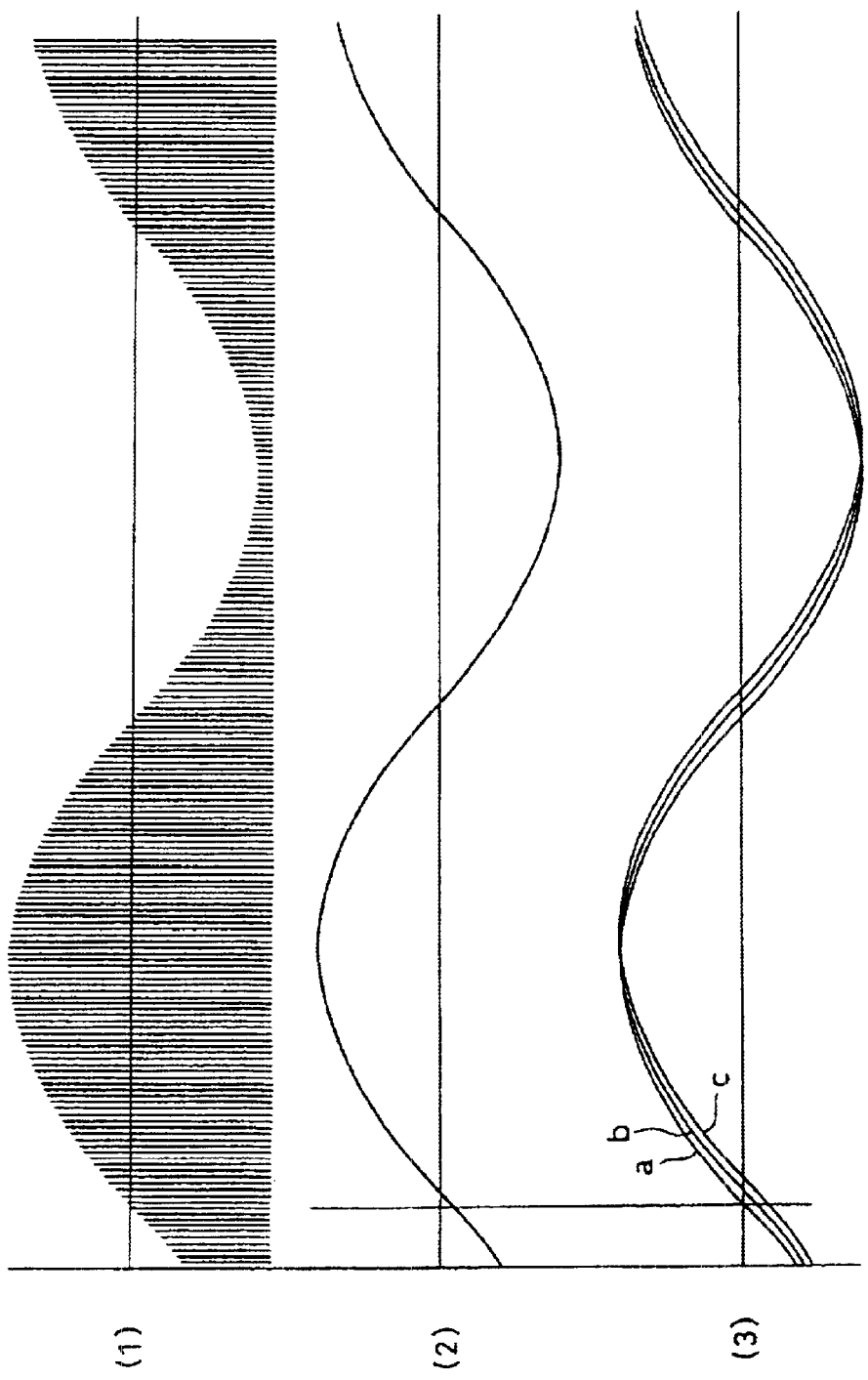
FIG. 7 is a graph showing the voltage output state of the portable generator according to the invention.

This PWM control signal, when the leading value in the PWM reference table is 0, is generated, by adding the value equivalent to a half of one clock time in the read-out clock for reading PWM reference values to each PWM reference value that has been read out, as a pulse signal whose duty ratio is 50% when the PWM reference value is 0. For this reason, each pulse of PWM control signals undergoes successive variations in duty ratio to match the shape of the sine-wave as shown in FIG. 7(1), so that the duty ratio of this pulse signal successively varies in a range of several tens of percent to several tens of percent before 100% around a center value of 50%, and such pulse signals constitute a string in which the duty ratio varies successively in the shape of the reference sine-wave.

Then, the PWM driver 311 amplifies the current of this PWM control signal to form a first PWM signal to be supplied to the first transistor 131 and the fourth transistor 134, also inverts and amplifies this PWM control signal to form a second PWM signal to be supplied to the second transistor 132 and the third transistor 133, and supplies the first PWM signal and the second PWM signal to the inverter circuit 130.

Further, the voltage-waveform-monitoring unit 433 of the central control unit 310 has an output voltage table for storing many voltage table values respectively matching the PWM reference values. Then, at the timing at which the PWM-signal-generating unit 441 reads PWM reference values out of the PWM reference table, the voltage-waveform-monitoring unit 433 reads voltage table values out of the output voltage table, compares the read voltage table values with output voltages entered from the output-voltage-detecting circuit 340, and corrects the pulse width of each pulse signal forming the PWM control signal to be supplied by the PWM-signal-generating unit 441, and thereby regulates the output voltage.

Then, when a start switch (not shown) is manipulated and the PWM control signal is supplied from the PWM-signal-generating unit 441 to start the output of the single-phase AC voltage from the first output terminal 151 and the second output terminal 152, the central control unit 310 judges whether or not the zero cross signal from the square-wave-forming circuit 317 has been entered and, if zero cross signal has not been entered, starts the operation of the independent-operation-control unit 435.

The start of the operation of this independent-operation-control unit 435 causes the PWM-signal-generating unit 441 of the central control unit 310 to supply a PWM control signal to form such a voltage that the average output voltage between the first output terminal 151 and the second output terminal 152 is 100 V or the like as set by the setting switch 318 and the frequency is 50 Hz or 60 Hz as set.

The frequency of this output voltage determines the frequency of the single-phase AC voltage supplied by the portable generator 100 according to whether to select a clock to read 100 to several hundreds of PWM reference values, which are recorded in the PWM reference table of the PWM-signal-generating unit 441 and which constitute a one-period equivalent of the single-phase AC voltage, in 20 msec or another clock to read them in 16.66 msec.

Moreover, in setting the output voltage, PWM reference values recorded in the PWM reference table are multiplied or added by a correction factor to form corrected reference values, and the pulse width of a pulse signal as the PWM control signal is determined on the basis of this corrected reference value. Then, the independent-operation-control unit 435 reads, from the output-voltage-setting unit 417, the correction factor for calculating the corrected reference values from these PWM reference values, and hands over this correction factor to the PWM-signal-generating unit 441.

Further, after the PWM-signal-generating unit 441 supplies the PWM control signal, the output-voltage-waveform-monitoring unit 433 monitors the peak voltage and the distortion of the sine-wave on the basis of the output voltage signal from the output-voltage-detecting circuit 340. Then, if the peak voltage varies from its setpoint, a correction factor for correcting the difference from the set voltage is caused to be read from the output-voltage-waveform-monitoring unit 433 into the PWM-signal-generating unit 441. Moreover, if the distortion of the sine-wave is sustained, a single-phase AC voltage, which has been set by having a correction factor read into the PWM-signal-generating unit 441 to provide a smooth sine-wave, caused to be supplied.

Further, since the waveform of the single-phase AC voltage may be distorted depending on the capacity or the type of the load, control is effected to keep the output voltage in a prescribed sine-wave shape all the time by correcting the PWM control signal to match the output amperage.

For this correction, a modifier Y for correcting PWM reference values according to the internal impedance of the power circuit 101, the output amperage and the output voltage is first stored matching each PWM reference value. Then, when causing the PWM-signal-generating unit 441 to generate a PWM control signal next time on the basis of each PWM reference value, correction is done by adding the modifier Y matching each PWM reference value, or subtracting the modifier Y from the PWM reference value. A PWM control signal is generated according to a corrected PWM reference value obtained in this way.

Regarding this modifier Y, a modifier Yn matching each PWM reference value Pn is figured out by reading an Nth PWM reference value Pn in the PWM reference table to supply a PWM control signal from the PWM-signal-generating unit 441, and using constants M, T, Z and S as coefficients, where the output voltage which is the potential difference between the first output terminal 151 and the second output terminal 152 according to this PWM control signal is V volts and the output amperage then is I amperes.

This modifier Yn is calculated by the equation:

$Yn=\{(Qn-V/M)/T\}-I \cdot Z \cdot S$ with respect to an Nth PWM reference value Pn.

As the PWM reference value Pn for the next round a period later than the storing of this modifier Yn, the modification reference is calculated by the correction of:

Pn−Yn and a PWM control signal based on a PWM reference value, which is the calculated modification reference is supplied from the PWM-signal-generating unit 441.

The value Qn used in calculating this modifier Yn is a voltage table value representing the output voltage which is to generate between the first output terminal 151 and the second output terminal 152 in the absence of any load on the pertinent portable generator 100 when a pulse signal as the PWM control signal based on the Nth PWM reference value Pn is supplied from the PWM-signal-generating unit 441. The value M is the variation in voltage table value matching a variation in output voltage by 1 V. The value Z is the internal impedance of the power circuit 101, i.e. mainly the impedance of the low pass filter 140. The value S is the variation in PWM reference value that gives rise to a variation by 1 V between the first output terminal 151 and the second output terminal 152. The value T is the ratio between the variation in PWM reference value matching a variation in output voltage by 1 V and the variation in voltage table value.

Thus, the output-voltage-waveform-monitoring unit 433 and the PWM-signal-generating unit 441 corrects each PWM reference value to generate a PWM control signal so as to modify the Nth PWM reference value Pn with (Qn−V/M)/T, which is a voltage correction term according to the difference between the voltage table value Qn matched with the load-free output voltage at the time of supplying a PWM control signal of a prescribed pulse width from the PWM-signal-generating unit 441 and the actually detected output voltage V based on this PWM control signal, and with $I \cdot Z \cdot S$, which is the current correction term according to the internal impedance Z and the output current at the time.

Figure 8:
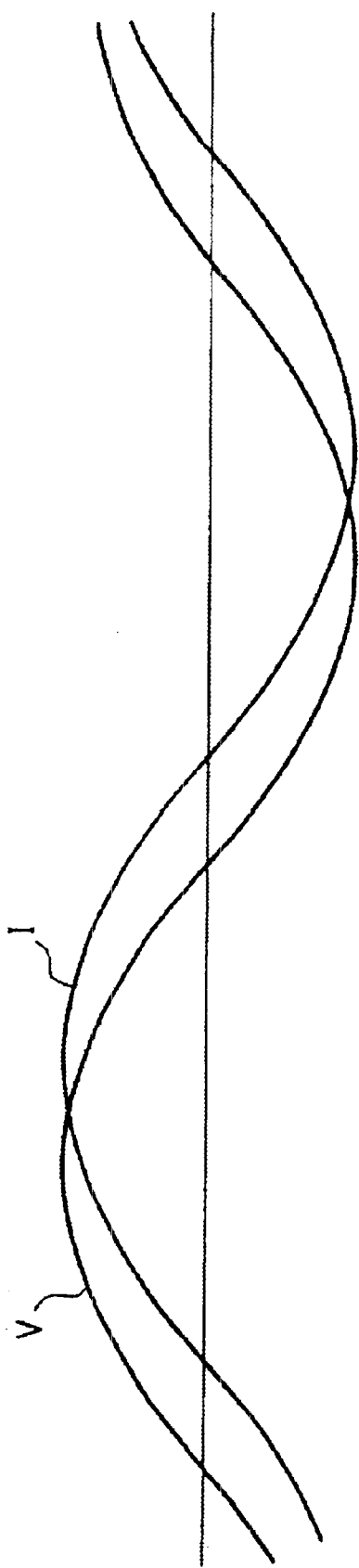
FIG. 8 is a graph showing one example of phase difference between the output voltage and the output current.

Therefore, as shown in FIG. 8, as a condensive load giving rise to a phase difference between the output voltage V and the output current I is connected to the first output terminal 151 and the second output terminal 152, or as a lag load giving rise to a phase difference is connected to the first output terminal 151 and the second output terminal 152, a phase difference arises between the output voltage and the output current. Moreover, even when the output voltage is distorted by the output amperage or the like, this portable generator 100 modifies each PWM reference value Pn with a modifier Yn having a current correction term ($I \cdot Z \cdot S$) for correcting the output voltage according to the amperage I from moment to moment, and also having a voltage correction term for modifying the difference between the voltage table value Qn giving a load-free output voltage and the detected output voltage V. Thereby correction to bring the output voltage waveform close to an appropriate sine-wave can be accomplished all the time whatever the output amperage is and regardless of the phase difference between the output voltage and the output current.

Then, in this portable generator 100, the PWM reference values stored in the PWM reference table and the voltage table values stored in the output voltage table can be kept equal if the voltage division ratio of the output-voltage-detecting circuit 340 and the A/D conversion ratio in converting the output voltage signal from analog to digital are so set that the voltage table value Qn corresponding to S V, which is the variation of this output voltage, may vary by 1, though a voltage variation by S V arises between the first output terminal 151 and the second output terminal 152 when the value of the PWM reference value has varied by 1 owing to the characteristics of the inverter circuit 130 and the low pass filter 140. Further, if the voltage division ratio of the output-voltage-detecting circuit 340 and the A/D conversion ratio are so set as to equalize the PWM reference values and the matching voltage table values, arithmetic operation in the central control unit 310 can be processed with the constant M and the constant T for use in calculating the aforementioned modifier Yn being also supposed to be 1.

Moreover, if the ratio between the value of the output current signal supplied by the output-current-detecting circuit 330 and the value of the output current itself and the A/D conversion ratio in converting the output voltage signal from analog to digital are prescribed and the ratio of the digital output current signal to the value of the output current is set equal to the product of the internal impedance Z of the power circuit 101 multiplied by S, which is the output voltage variation when the value of the PWM reference value has varied by 1, the value of the output current signal digitized by the A/D converter 411 of the central control unit 310 can be directly put to arithmetic operation as the value of the current correction term ($I \cdot Z \cdot S$)

Therefore, in the central control unit 310 having the PWM-signal-generating unit 441 which, with the leading value of the PWM reference values to be stored in the PWM reference table being 0, generates a PWM control signal having a duty ratio of 50% on the basis of this PWM reference value 0, each modifier Yn matching each PWM reference value Pn can be calculated and stored merely by, in the output-voltage-waveform-monitoring unit 433, subtracting the value of the output voltage signal to be entered into the output-voltage-waveform-monitoring unit 433 from the difference between the PWM reference value stored in the PWM reference table and the output voltage signal to be entered into the output-voltage-waveform-monitoring unit 433.

Then, if the PWM control signal is generated in the PWM-signal-generating unit 441 by subtracting each modifier Yn according to this detected value of the output current signal and to the value of the output voltage signal from each PWM reference value Pn, the output voltage generating between the first output terminal 151 and the second output terminal 152 can be made a voltage of an appropriate sine-wave shape.

Incidentally, during the infinitesimal length of time from the time a pulse signal whose duty ratio is 50% is supplied as the PWM control signal from the central control unit 310 until an output voltage signal representing an output voltage of 0 is entered into the central control unit 310 in response to this pulse signal, voltage table values preset according to the circuit characteristics of the inverter circuit 130 and the like are compared with the detected output voltage. However, this infinitesimal difference in length but may be corrected in accordance with a zero cross signal entered from the square-wave-forming circuit 317 to appropriately adjust the relationship of the PWM control signal to the output voltage supplied to the first output terminal 151 and the second output terminal 152.

Moreover, in starting the output of the PWM control signal from the PWM-signal-generating unit 441, when a zero cross signal is entered from the square-wave-forming circuit 317 into the central control unit 310, the central control unit 310 starts the operation of the synchronous-operation-control unit 437.

This synchronous-operation-control unit 437 first judges, according to the entry intervals of the zero cross signal, whether or not the frequency of the voltage generated between the first output terminal 151 and the second output terminal 152 is identical with the frequency set by the setting switch 318.

Then, when the frequency is identical, the synchronous-operation-control unit 437 judges, according to the output voltage signal, whether or not the peak voltage is substantially equal to the peak level of the voltage set by the setting switch 318.

In this way, the voltage generated between the first output terminal 151 and the second output terminal 152 is compared with the frequency and the voltage set by the setting switch 318 and, if it is found not to be identical with the respective setpoints, the synchronous-operation-control unit 437 issues an abnormality signal to the display-control unit 425 without starting the operation of the PWM-signal-generating unit 441, and causes the display-control unit 425 to issue a required display signal to the operating-state-display unit 427.

Moreover, when the frequency and the voltage are found to be identical with the respective setpoints, the synchronous-operation-control unit 437 causes the PWM-signal-generating unit 441 to start operating at the rising of the zero cross signal from the square-wave-forming circuit 317, and causes the PWM-signal-generating unit 441 to read out the PWM reference values of the PWM reference table from the top position onward to start supplying the PWM control signal.

To add, the central control unit 310 in this portable generator 100, once the PWM-signal-generating unit 441 starts operating, as in the independent operation described above, causes the PWM-signal-generating unit 441 to generate the PWM control signal on the basis of modification reference values resulting from the modification of PWM reference values by the output-voltage-waveform-monitoring unit 433 according to the modifier Y.

Thus is started the operation of the inverter circuit 130, the single-phase AC voltage is supplied via the low pass filter 140 between the first output terminal 151 and the second output terminal 152, and a single-phase AC voltage of an appropriate sine-wave shape can be supplied from this portable generator 100, which is an AC power supply unit, while making identical in phase and voltage level this single-phase AC voltage and the AC voltage entered between the first output terminal 151 and the second output terminal 152.

Then, after the start of synchronous operation, the synchronous-operation-control unit 437, every time the PWM-signal-generating unit 441 supplies a PWM control signal based on 0, which is a leading value of the PWM reference values, determines the zero cross signal entered into the central control unit 310, and performs phase adjusting control between the portable generator 100 and other generators.

The single-phase AC voltage, which is output voltage during this synchronous operation, as shown in FIG. 7(1), causes a sine-wave having a zero cross point substantially identical with 0 of the PWM reference signal as shown as a sine-wave of a in FIG. 7(3) to be supplied from the low pass filter 140 when a PWM control signal based on a PWM reference value is issued. However, if there is a phase lag between this voltage supplied by the portable generator 100 via the low pass filter 140 and the sine-wave voltage supplied by another generator as shown as c in FIG. 7(3), the voltage generating between the first output terminal 151 and the second output terminal 152 becomes a synthesized voltage of the both voltages as shown as b in FIG. 7(3). Thus, against the zero cross point of the reference sine-wave shown in FIG. 7(1), there emerges the sine-wave shown in FIG. 7(2) and the zero cross point of the output voltage signal deviates from the zero cross point of the reference sine-wave.

Therefore, if the square wave which is made the zero cross signal of the output voltage at the timing of issuing a PWM control signal based on 0 of the PWM reference value is at an L level, it is judged that the single-phase AC voltage supplied by the portable generator 100 is ahead in phase relative to the voltage supplied by another generator in parallel operation, and the synchronous-operation-control unit 437 performs control to elongate the period of the reference sine-wave as the PWM control signal.

Moreover, if the square wave which is made the zero cross signal of the output voltage at the timing of issuing a PWM control signal based on 0 of the PWM reference value is at an H level, the synchronous-operation-control unit 437 performs control to shorten the period of the reference sine-wave.

In regulating the period of the reference sine-wave to be formed of this PWM control signal, the synchronous-operation-control unit 437 alters the intervals of the clock in which PWM reference values are read out of the PWM reference table.

The intervals of the clock are such that a frequency-dividing circuit for generating the read-out clock for PWM reference values is so controlled as to generate several to about 10 clock signals made longer or shorter by several percent to 10% in one clock time (time interval of one step in a PWM modulation period) in 100 to several hundred clocks constituting one period.

Thus, in order to detect the positivity or negativity of the voltage generating between the first output terminal 151 and the second output terminal 152 at the timing of the zero cross point of the reference sine-wave according to the PWM control signal generated by the PWM-signal-generating unit 441, i.e. the lag of the zero cross point between the reference sine-wave and the output voltage and to adjust the output timing of the reference sine-wave, the influence based on the phase difference between the output voltage and the output current due to the type of load is eliminated to make it possible to accurately modify the difference of the phase of the output voltage between another generator and the portable generator 100.

Moreover, this frequency adjustment of the reference sine-wave according to the PWM control signal involves only the alteration of the pulse intervals of the clock signal, i.e. the output intervals of the PWM control signal, by several percent to 10%, but no change is made of the number of pulse signals to be made PWM control signals and the pulse width of each pulse as a PWM control signal, which is the value of each PWM control signal. Therefore, the period can be adjusted and altered while smoothly varying the waveforms of the reference sine-wave formed by the PWM control signal and of the single-phase AC voltage supplied by the portable generator 100.

Then, the output-voltage-waveform-monitoring unit 433, as stated above, has an output voltage table, compares a voltage table value read out of the output voltage table and an output voltage read from the output voltage signal, and causes the PWM-signal-generating unit 441 to modify the pulse width of the pulse signal constituting a PWM control signal. However, if the output voltage detected during synchronous operation continues to be greater than the corresponding voltage table value, the pulse width of the PWM control signal is modified to be greater by multiplying the PWM reference value or the modified reference value by a coefficient matching the quantity of this variation.

Incidentally, during independent operation, the independent-operation-control unit 435 and the PWM-signal-generating unit 441 are conversely caused to perform modification to reduce the output voltage by narrowing the pulse width of the PWM control signal. Moreover, the output-voltage-waveform-monitoring unit 433, matching this pulse width adjustment of the PWM control signal, also modifies the voltage table value to compare the voltage table value and the output voltage in the output-voltage-waveform-monitoring unit 433.

Thus, it is possible to raise the single-phase AC voltage supplied via the inverter circuit 130 and the low pass filter 140 of the portable generator 100 when the output voltage has risen during synchronous operation by expanding the pulse width of the pulse signal as the PWM control signal, and subsequently to follow changes in the voltage supplied by another generator in parallel operation.

Moreover, this synchronous-operation-control unit 437 also regulates the output voltage by adjusting the pulse width of the PWM control signal on the basis of the output amperage from the output-current-detecting circuit 330.

This output voltage regulation is done by further multiplying the PWM reference value or the modification reference by a coefficient to reduce the single-phase AC voltage by about 1% when the amperage supplied from the first output terminal 151 or the second output terminal 152 in response to the output current signal has surpassed a prescribed level, which is 85% to 90% of the rated amperage, thereby to slightly narrow the pulse width of the pulse signal as the PWM control signal and further to modify the voltage table value as well.

In this way, when the output amperage has increased to a level close to the rated amperage, it is possible to prevent the load sharing between generators operating in parallel from becoming too heavy on either generator by slightly reducing the output voltage.

Then, the central control unit 310 causes, in addition to the independent-operation-control unit 435 and the synchronous-operation-control unit 437, the output-voltage-waveform-monitoring unit 433 and the PWM-signal-generating unit 441 to generate a PWM control signal so as to give a prescribed sine-wave shape to the output voltage generating between the first output terminal 151 and the second output terminal 152. However, the correction of the PWM reference value to generate this PWM control signal may involve subtraction or division applied to a PWM reference value in the latter half period of the PWM reference table when a PWM reference value in the former half period of the PWM reference table is to be added or multiplied.

Namely, as described above, with the leading value of the PWM reference values to be stored in the PWM reference table being 0, in the former half cycle the duty ratio of the pulse in the PWM control signal generated to match this PWM reference value of 0 is 50% and in which the pulse width is varied in a sine-wave shape matching the PWM reference value as values successively surpassing the duty ratio of 50% based on the PWM reference value, and also in the latter half cycle the duty ratio of the PWM reference value of 0 is 50% and the pulse width is varied in a sine-wave shape matching each PWM reference value as a value smaller than 50% with reference to the 50% duty ratio. In one period of the PWM control signal so formed, the PWM reference value is corrected by addition or subtraction throughout the full period.

However, where there is a PWM reference table in which the PWM reference value is a prescribed positive value other than 0 and the PWM reference value is varied around the prescribed value in a sine-wave shape to be greater than or smaller than the prescribed value, and where a PWM control signal whose duty ratio is 50% is to be generated by th PWM-signal-generating unit 441 on the basis of the leading value of the PWM reference values, which is a prescribed value stored in this PWM reference table, the PWM reference value is corrected by subtraction in the latter half cycle if addition is done in the former half cycle, or by division in the latter half cycle if multiplication is done in the former half cycle.

Figure 9:
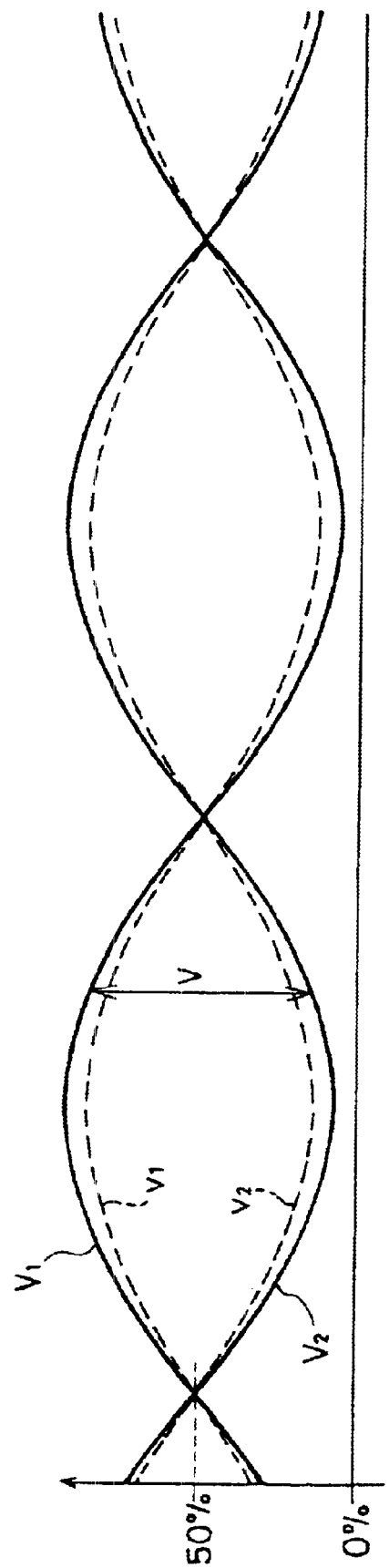
FIG. 9 is a graph showing the corrected state of the output voltage.
Figure 10:
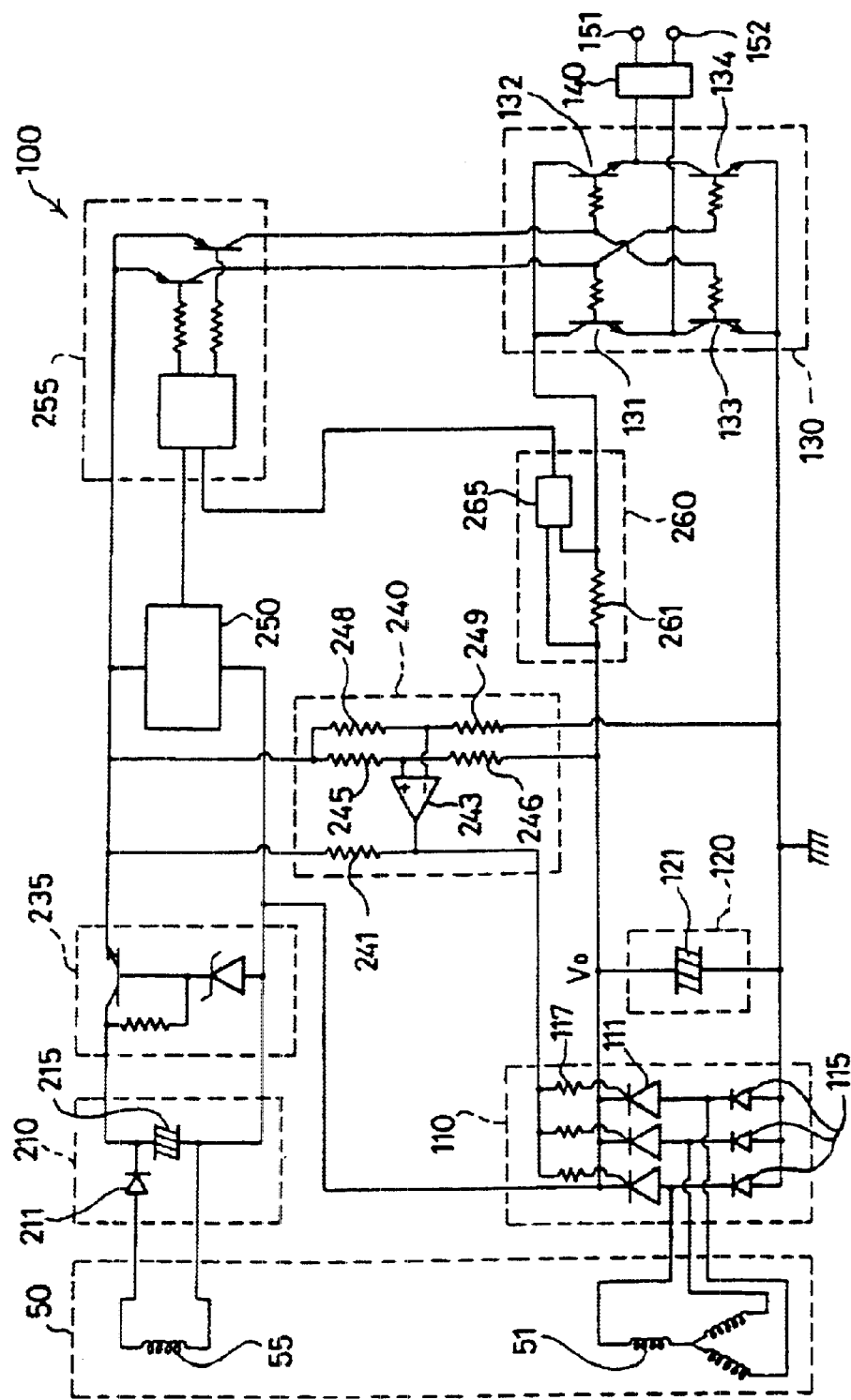
FIG. 10 is a circuit block diagram showing an example of portable generator according to the prior art.
Figure 11:
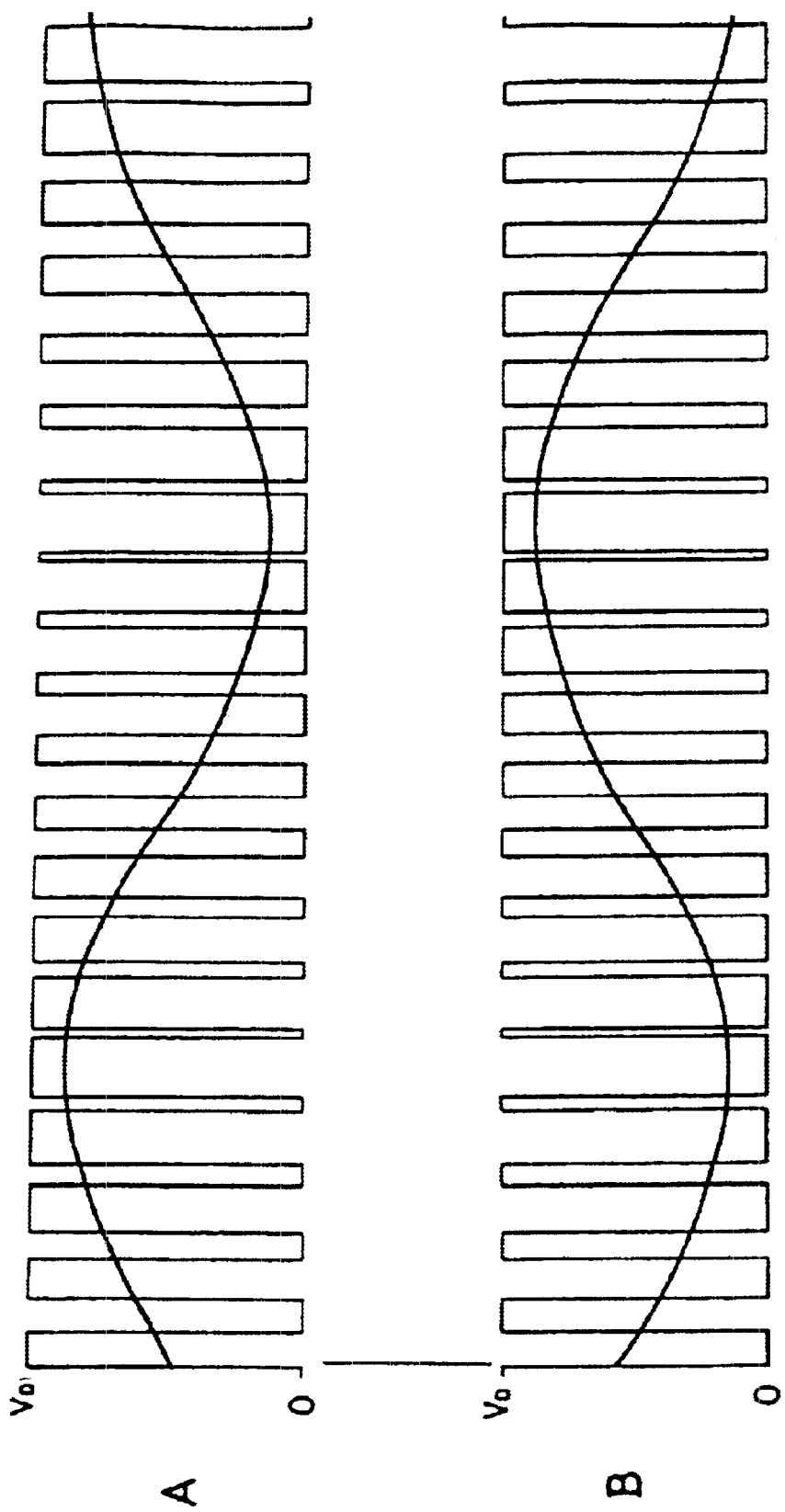
FIG. 11 comprises schematic diagrams showing output voltages.
Figure 12:
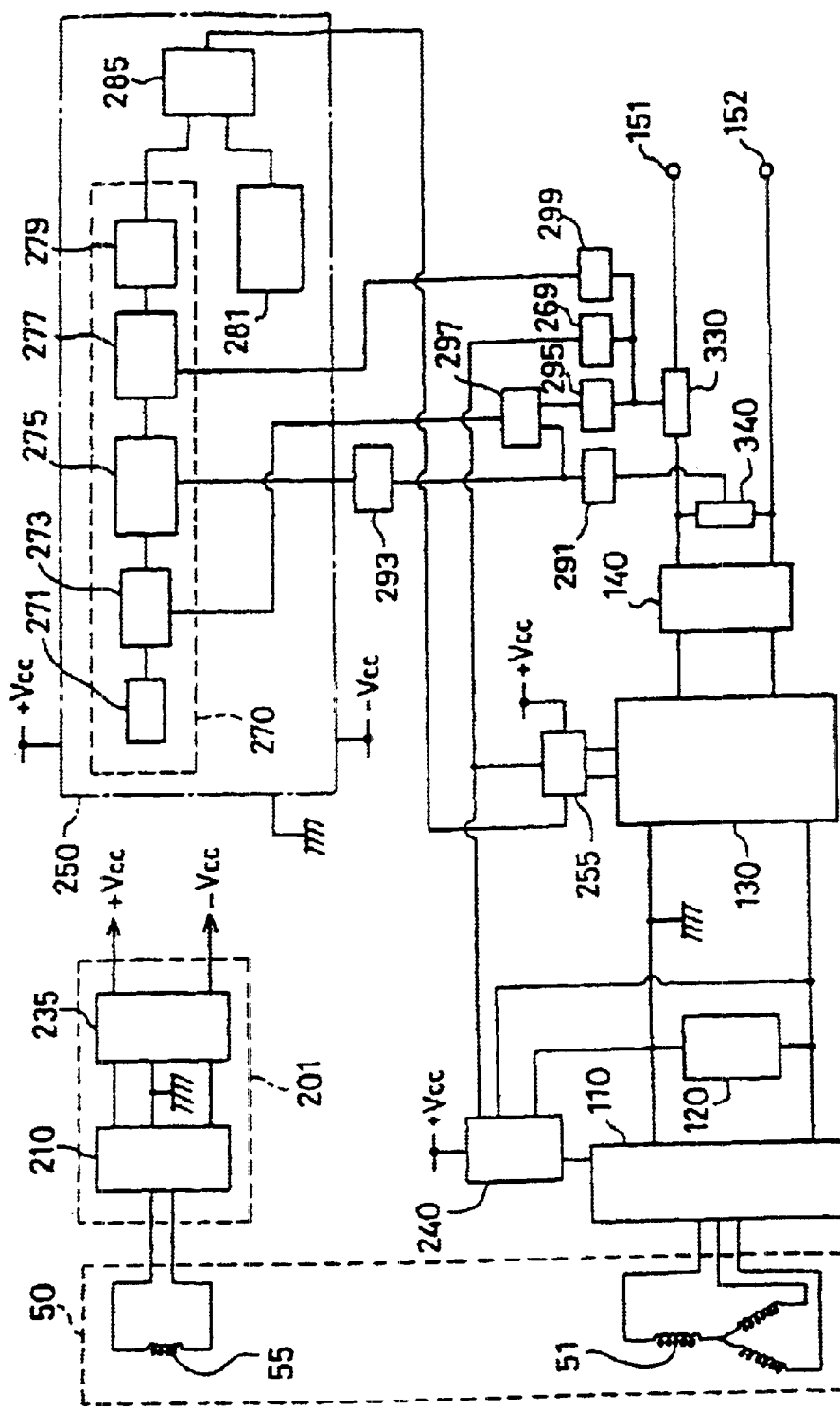
FIG. 12 is a circuit block diagram showing another example of portable generator according to the prior art.
Figure 13:
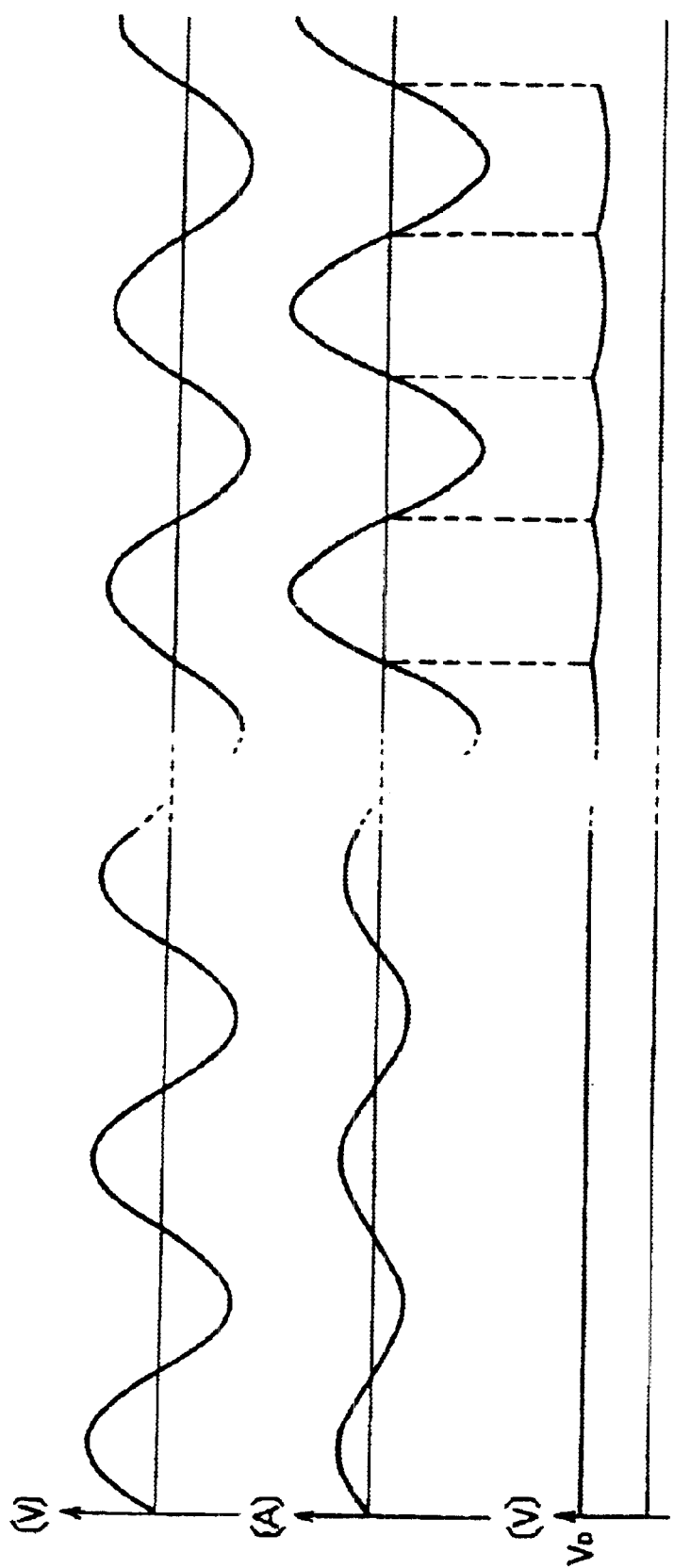
FIG. 13 is a graph showing the relationship among the output voltage, the output current and the DC voltage in the portable generator according to the prior art.

In this way, changing over between addition and subtraction or between multiplication and division between the former and latter half periods, as shown in FIG. 9, the output voltage V, which constitutes differential voltage between the both terminals in one half period where a first output voltage V1 which is the output voltage of the first output terminal 151, is greater than a second output voltage V2, which is the output voltage of the second output terminal 152, is reduced by modifying to lower the first output voltage V1, and in the other half period where the first output voltage V1 is smaller than the second output voltage V2, the output voltage V can be reduced as in the former half period by modifying to heighten the first output voltage V1.

Further, this central control unit 310 controls the DC-voltage-generating circuit 110 over the output voltage with the circuit-protecting unit 431, and also effects revolution control over the engine with the throttle-opening-control unit 423.

The control over the DC-voltage-generating circuit 110 by this circuit-protecting unit 431 is carried out by the stopping circuit 360 via the thyristor-control circuit 170. This stopping circuit 360, as shown in FIG. 3, is configured of a switching transistor 361 whose base is connected to the central control unit 310. The emitter of the switching transistor 361 is grounded, and the collector thereof is connected to the cathode of the light emitting diode 177 in the photocoupler 175.

When this stopping circuit 360 is to control the DC-voltage-generating circuit 110, at the time of starting the engine, the stop control signal is supplied from the circuit protecting unit 431 to the stopping circuit 360 until the revolution frequency signal entered from the revolution-frequency-detecting circuit 319 keeps being stabilized, and the light emitting diode 177 is turned on not to allow the thyristor-control circuit 170 to issue any continuity signal.

Then, when the revolutions of the engine have become stabilized, the circuit-protecting unit 431 stops the output of the stop control signal, and confirms, according to a DC voltage signal from the DC-voltage-detecting circuit 320, that the voltage of the DC-power-source unit 120 has reached a prescribed voltage between 160 and 200 V. Then, the circuit-protecting unit 431 starts the output of the PWM control signal from the PWM-signal-generating unit 441 under the control of the independent-operation-control unit 435 or the synchronous-operation-control unit 437.

Further, the engine is controlled by turning a pulse motor of the throttle-control mechanism 315 either forward or backward with the engine-speed-detecting unit 421 and the throttle-opening-control unit 423 via the throttle driver 313.

This engine revolution control procedure, by setting the opening degree signal entered from the throttle-control mechanism 315 to a prescribed value to match the output current signal from the output-current-detecting circuit 330, or by setting the count of the pulse counter of the throttle-control mechanism 315 to a prescribed value, provides a prescribed frequency of revolution to match the output. Moreover, highly efficient voltage conversion is carried out by correcting the throttle opening to match the ratio of the length of time during which a continuity signal is supplied to the DC-voltage-generating circuit 110 according to the cathode potential of the light emitting diode 177 in the photocoupler 175, i.e. the continuity rate of the thyristors 111.

Moreover, in this portable generator 100, when any overcurrent exceeding the rated amperage flows, the circuit-protecting unit 431 of the central control unit 310 performs control to stop the operation of the DC-voltage-generating circuit 110 and the inverter circuit 130. Therefore, it is possible to protect the power circuit 101 by stopping the single-phase AC voltage supply from the portable generator 100. Moreover, in the portable generator 100, the overcurrent-detecting circuit 350 also effects control to stop the operation of the DC-voltage-generating circuit 110.

This control by the circuit-protecting unit 431 to protect power circuit 101 stops the output of the PWM control signal from the PWM-signal-generating unit 441 after the lapse of several seconds to several minutes when the output amperage has surpassed 1.2 times of the rated voltage, and starts supplying a stop control signal to the stopping circuit 360.

Then, when the output amperage is so large according to the value that is an excess to 1.2 times of the rated amperage, the supply of the stop control signal is started after the lapse of a smaller length of time and the PWM-signal-generating unit 441 is caused to stop supplying the PWM control signal, or when the value is small, the supply of the stop control signal is started and stop control over the output of the PWM control signal is effected after the lapse of a greater length of time, thereby to stop supplying the single-phase AC voltage. Moreover, when the output amperage has surpassed twofold of the rated voltage, the output of the PWM control signal is immediately stopped, and the output of the stop control signal is started to stop supplying the single-phase AC voltage.

Further, when the generation of an abnormal voltage in the power circuit 101 is detected: i.e. when the DC voltage detected by the DC-voltage-detecting circuit 320 or the output voltage detected by the output-voltage-detecting circuit 340 becomes abnormally high, when the output voltage drops substantially below its setpoint, e.g. 100 V, or when a lower voltage than 100 V is sustained; the circuit-protecting unit 431 also supplies a stop control signal to the stopping circuit 360 and, by causing the PWM-signal-generating unit 441 to stop supplying the PWM control signal, stops the output of the single-phase AC voltage from the first output terminal 151 and the second output terminal 152.

Moreover, the overcurrent-detecting circuit 350 provided separately from the central control unit 310, when the output amperage has reached nearly twofold of the rated voltage, stops the output of the continuity signal from the thyristor-control circuit 170 to the DC-voltage-generating circuit 110 by issuing an L level stop signal to the photocoupler 175.

Accordingly, when the output amperage has reached nearly twofold of the rated voltage, each of the thyristors 111 of the DC-voltage-generating circuit 110 is placed in a state of discontinuity, and the power supply from the DC-power-source unit 120 to the AC generator 50 is stopped. Therefore, the output voltage of the DC-power-source unit 120 drops.

Therefore, there is a drop in the output voltage which results from the conversion of the output voltage of the DC-power-source unit 120 into an AC voltage under PWM control and is the potential difference between the first output terminal 151 and the second output terminal 152, generated by the first PWM signal and the second PWM signal in accordance with a PWM control signal given a fixed duty ratio, and the load current is also reduced. Thus, it is possible to prevent the output of the single-phase AC voltage from being immediately stopped when the output current has surpassed twofold of the rated amperage or to prevent the output of single-phase AC voltage from being stopped in a very short length of time when the output amperage has substantially surpassed 1.2 times of the rated amperage.

To add, the reference voltage to be set for the overcurrent-detecting circuit 350 to supply a stop signal is not limited to detection of what matches almost twofold of the rated amperage by the output-current-detecting circuit 330, but it can be set to 1.5 times the rated amperage instead. In this case, the rectifying action of the DC-voltage-generating circuit 110 is stopped when a current surpassing 1.5 times the rated amperage is about to flow, thereby to stop power supply from the DC-power-source unit 120 to the AC generator 50 and to reduce the output voltage. Thus, an appropriate value is set in the overcurrent-detecting circuit 350 together with the output amperage at the time of supplying a stop control signal by the central control unit 310 according to the characteristics, durability and safety standards of the elements constituting the power circuit 101.

As described above, this portable generator 100 has the output-current-detecting circuit 330 which detects the output current and supplies the output current signal, and the continuity-control-signal-generating circuit 510 which compares, on the basis of this output current signal, the reference voltage which rises matching an increase in the output current and the detected voltage resulting from the division of the output voltage of the DC-power-source unit 120 and supplies the continuity control signal. As it is further provided with the constant-voltage-control unit 500 using the thyristor-control circuit 170 which controls continuity or discontinuity of the thyristors 111 in the DC-voltage-generating circuit 110 by supplying the continuity signal to the DC-voltage-generating circuit 110 in accordance with the continuity control signal, the continuity control signal can be issued from the continuity-control-signal-generating circuit 510 to advance the start of continuity of the thyristors 111 slightly before a load is connected to the first output terminal 151 and the second output terminal 152 and the output voltage of the DC-power-source unit 120 is reduced to a prescribed level VD by the output current.

For this reason, this portable generator 100, when a heavy load is connected to the first output terminal 151 and the second output terminal 152 and the magnitude of the output current makes the current supply from the DC-voltage-generating circuit 110 to the DC-power-source unit 120 intermittent, can prevent any lag in current supply from the DC-voltage-generating circuit 110 relative to the current drain from the DC-power-source unit 120 from bringing down the output voltage of the DC-power-source unit 120 below the prescribed level VD. Also, even where the output current is large, the output voltage from the first output terminal 151 and the second output terminal 152 can be prevented from dropping while causing the inverter circuit 130 to perform AC conversion by using a PWM control signal of a prescribed duty ratio. Even if the duty ratio of the PWM control signal has to be altered to regulate the output voltage from the first output terminal 151 and the second output terminal 152, since the output voltage of the DC-power-source unit 120 does not drop where the output current is great, the portable generator 100 can control the increase in the duty ratio for maintaining a fixed output voltage, restraining the increase in the current flow to the power circuit 101, and to reduce the increase in energy loss, such as heating of the power circuit 101.

Although the above-described embodiment supposes a circuit configuration in which the constant-voltage-control unit 500 consists of the continuity-control-signal-generating circuit 510, the output-current-detecting circuit 330 and the thyristor-control circuit 170, the portable generator 100 can dispense with the continuity-control-signal-generating circuit 510, and instead it may be programmed to form the constant-voltage-control unit 500 within the central control unit 310 into which the output current signal from the output-current-detecting circuit 330 is to be entered. In this case, the output timing of the continuity signal is regulated on the basis of the output current signal from the output-current-detecting circuit 330 while keeping the voltage of the DC-power-source unit 120 constant by controlling the supply of the continuity signal from the thyristor-control circuit 170 on the basis of the DC voltage signal entered from the DC voltage detecting circuit 320 to the central control unit 310.

INDUSTRIAL APPLICABILITY

According to the present invention, there is provided a portable generator which generates an AC voltage by turning an AC generator, once rectifies this AC voltage into a DC with a DC-voltage-generating circuit using thyristors to charge a DC power source unit, and causes an inverter circuit to generate a single-phase AC voltage of a fixed level and of a prescribed frequency from the DC output voltage of the DC power source unit, and the portable generator further having a constant-voltage-control unit which effects control to keep the voltage of the DC-power-source unit substantially constant by detecting the voltage of the DC-power-source unit and controlling the continuity angle of the thyristors, and at the same time effects control to advance the start of continuity of the thyristors when the amperage flowing to the inverter circuit becomes great.

Therefore, even when a heavy load is connected, it can prevent the output voltage from dropping and efficiently supply a stable voltage.

What is claimed is:

1. A portable generator generating an AC voltage with an AC generator turned by an engine, rectifying this AC voltage by a thyristor-based rectifier circuit which serves as a DC-voltage-generating circuit to charge a DC-power-source unit which stores electric charge, converting the DC voltage, which is generated by charging the DC-power-source unit, into a single-phase AC voltage of a prescribed frequency and of a constant voltage by an inverter circuit; and a constant-voltage-control unit that controls to keep the DC voltage of the DC-power-source unit substantially constant by detecting the voltage at the DC-power-source unit and subsequently by controlling the continuity angle of thyristors in the DC-voltage-generating circuit, and that controls, to prevent the DC-power-source unit from dropping, by detecting the amperage flowing in the inverter circuit and subsequently by advancing the start of continuity establishment of the thyristors when the amperage flowing in the inverter circuit increases.

* * * * *